(12) United States Patent
Nose et al.

(10) Patent No.: US 11,407,101 B2
(45) Date of Patent: Aug. 9, 2022

(54) LINK ACTUATING DEVICE

(71) Applicant: NTN CORPORATION, Osaka (JP)

(72) Inventors: Kenzou Nose, Iwata (JP); Hiroshi Isobe, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 17/113,668

(22) Filed: Dec. 7, 2020

(65) Prior Publication Data

US 2021/0086350 A1 Mar. 25, 2021

Related U.S. Application Data

(63) Continuation of application No. PCT/JP2019/022328, filed on Jun. 5, 2019.

(30) Foreign Application Priority Data

Jun. 8, 2018 (JP) .............................. JP2018-109983

(51) Int. Cl.
*B25J 9/12* (2006.01)
*B25J 9/10* (2006.01)
(Continued)

(52) U.S. Cl.
CPC .............. *B25J 9/106* (2013.01); *B25J 9/126* (2013.01); *B25J 9/0048* (2013.01); *B25J 17/0216* (2013.01)

(58) Field of Classification Search
CPC ...... B25J 9/0048; B25J 17/0216; B25J 9/106; B25J 9/126
See application file for complete search history.

(56) References Cited

U.S. PATENT DOCUMENTS

| 5,893,296 A | 4/1999 | Rosheim |
| 10,022,827 B2 | 7/2018 | Isobe et al. |

(Continued)

FOREIGN PATENT DOCUMENTS

| JP | 63-7286 A | 1/1988 |
| JP | 0987087 A | 3/2000 |

(Continued)

OTHER PUBLICATIONS

International Preliminary Report on Patentability dated Dec. 17, 2020 with Written Opinion of the International Searching Authority issued in International Patent Application No. PCT/JP2019/022328.

(Continued)

*Primary Examiner* — Randell J Krug

(57) ABSTRACT

In a link actuating device, a distal end side link hub is coupled to a proximal end side link hub via three or more link mechanisms. A posture control drive source configured to arbitrarily change the posture of the distal end side link hub is provided to each of two or more link mechanisms. The link actuating device includes a storage unit configured to store therein an operating position of the posture control drive source when the distal end side link hub is in a defined posture. In each of the two or more link mechanisms, a positioning portion is provided to at least one of the proximal side end link member, the distal side end link member, and the intermediate link member. A positioning member configured to position the distal end side link hub in the defined posture is dismountably mounted between a plurality of the positioning portions.

8 Claims, 16 Drawing Sheets

(51) Int. Cl.
  *B25J 9/00*     (2006.01)
  *B25J 17/02*    (2006.01)

(56) References Cited

U.S. PATENT DOCUMENTS

| | | | |
|---|---|---|---|
| 10,443,693 B2 * | 10/2019 | Sakata | F16H 21/46 |
| 10,780,574 B2 | 9/2020 | Nose | |
| 2014/0223722 A1 * | 8/2014 | Isobe | B25J 9/1623 29/700 |
| 2018/0290294 A1 * | 10/2018 | Nose | B25J 9/102 |
| 2019/0105769 A1 * | 4/2019 | Nose | B25J 9/06 |

FOREIGN PATENT DOCUMENTS

| | | | |
|---|---|---|---|
| JP | 2000-94245 A | 4/2000 |
| JP | 2013-96525 A | 5/2013 |
| JP | 2014-119069 A | 6/2014 |
| JP | 2017-115954 A | 6/2017 |
| JP | 2017-219122 A | 12/2017 |

OTHER PUBLICATIONS

International Search Report dated Aug. 20, 2019 in International Patent Application No. PCT/JP2019/022328.
European Search Report issued in European Application No. 19814691.2 dated Feb. 16, 2022.

\* cited by examiner

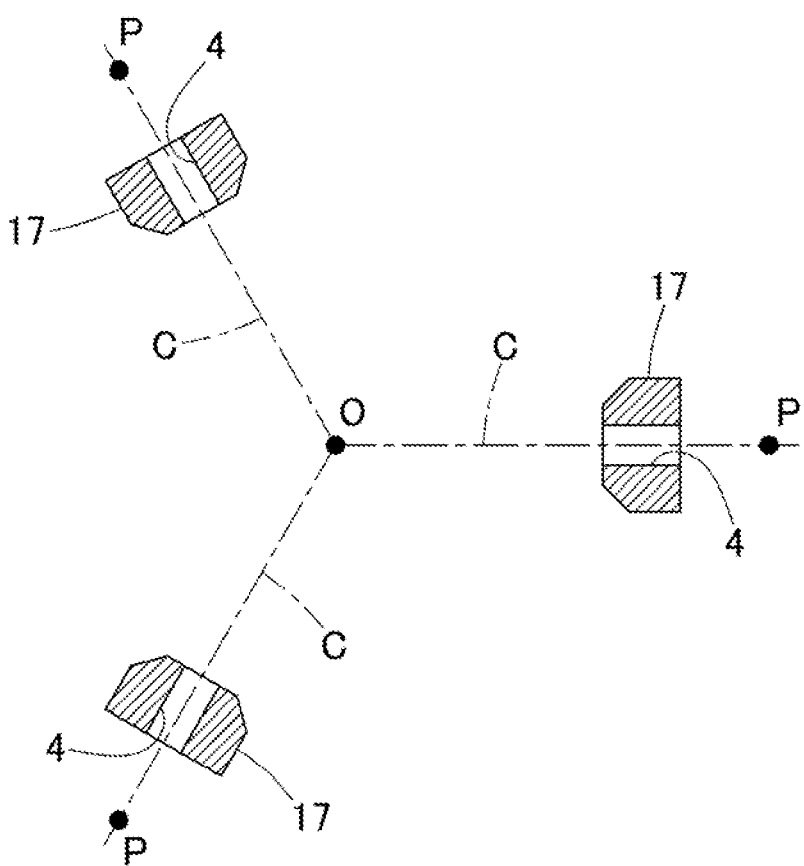

LINK ACTUATING DEVICE

CROSS REFERENCE TO THE RELATED APPLICATION

This application is a continuation application, under 35 U.S.C. § 111(a) of international patent application No. PCT/JP2019/022328, filed Jun. 5, 2019, which claims Convention priority to Japanese patent application No. 2018-109983, filed Jun. 8, 2018, the entire disclosures of all of which are herein incorporated by reference as a part of this application.

BACKGROUND OF THE INVENTION

Field of the Invention

The present invention relates to a link actuating device to be used in equipment that requires a precise and wide operating range such as medical equipment and industrial equipment.

Description of Related Art

Patent Documents 1 and 2 disclose link actuating devices to be used in various kinds of work. Regarding the link actuating device (parallel link mechanism) of Patent Document 1, the operating angle of each link is small, and thus, it is necessary to increase the link length in order to set the operating range of a travelling plate to be large. Accordingly, the dimensions of the entire mechanism are increased, and the size of the device is increased. In addition, when the link length is increased, the rigidity of the entire mechanism is reduced. Therefore, the weight of a tool to be mounted on the travelling plate, that is, the weight capacity of the travelling plate, is also limited to a small value.

In the link actuating device of Patent Document 2, a proximal end side link hub and a distal end side link hub are coupled to each other by three or more quadric chain link mechanisms. Accordingly, the link actuating device has a compact configuration but is capable of operating in a precise and wide operating range. However, also in the parallel link mechanism having this configuration, it is difficult to completely eliminate the mechanical backlash, and thus, the parallel link mechanism needs to be configured such that an origin can be positioned with good reproducibility.

Patent Document 3 proposes a link actuating device that has a configuration with three or more quadric chain link mechanisms, and in which an origin positioning member that sets a distal end side link hub in a defined posture with respect to a proximal end side link hub is provided. By providing the origin positioning member as described above, it is possible to position an origin with good reproducibility, and thus, initialization work for registering the positional relationship between the posture of the distal end side link hub and a posture control drive source in advance can be performed with high accuracy.

RELATED DOCUMENT

Patent Document

[Patent Document 1] JP Laid-open Patent Publication No. 2000-094245
[Patent Document 2] U.S. Pat. No. 5,893,296
[Patent Document 3] JP Laid-open Patent Publication No. 2014-119069

In the link actuating device of Patent Document 3, the origin positioning member is provided to the proximal end side link hub and the distal end side link hub. However, a cable such as an electric wire connected to an end effector mounted on the distal end side link hub is often passed through the proximal end side link hub and the distal end side link hub. Therefore, when performing origin positioning, it is necessary to dismount the end effector from the distal end side link hub, so as to prevent the origin positioning member from interfering with the end effector or cable.

SUMMARY OF THE INVENTION

An object of the present invention is to provide a link actuating device that is capable of operating in a wide operating range at high speed with high accuracy and that allows initialization work to be easily performed.

A link actuating device according to the present invention includes: a proximal end side link hub; a distal end side link hub; and three or more link mechanisms via which the distal end side link hub is coupled to the proximal end side link hub such that a posture of the distal end side link hub can be changed relative to the proximal end side link hub. Each of the link mechanisms includes: a proximal side end link member rotatably coupled at one end thereof to the proximal end side link hub; a distal side end link member rotatably coupled at one end thereof to the distal end side link hub; and an intermediate link member rotatably coupled at both ends thereof to other ends of the proximal side and distal side end link members. A posture control drive source configured to arbitrarily change the posture of the distal end side link hub relative to the proximal end side link hub is provided to each of two or more link mechanisms of the three or more link mechanisms. The link actuating device further includes: a storage unit configured to store therein an operating position of the posture control drive source when the distal end side link hub is in a defined posture relative to the proximal end side link hub; a positioning member configured to position the distal end side link hub in the defined posture by restricting postures of a plurality of the link members relative to each other, the positioning member being provided to at least one link member of the proximal side end link member, the distal side end link member and the intermediate link member in each of the two or more link mechanisms of the three or more link mechanisms; and a positioning portion on which the positioning member detachably is mounted.

In the link actuating device having this configuration, the proximal end side link hub, the distal end side link hub, and the three or more link mechanisms form a two-degrees-of-freedom parallel link mechanism in which the distal end side link hub is rotatable about two mutually orthogonal axes relative to the proximal end side link hub. The parallel link mechanism is compact in size, but can achieve a wide range of movement for the distal end side link hub. By providing the posture change drive source to each of the two or more link mechanisms of the three or more link mechanisms, the posture of the distal end side link hub can be determined. Thus, it is possible to change the posture of the distal end side link hub in a wide range by operating the parallel link mechanism with the posture change drive sources.

The positioning member is used as a dedicated jig for positioning the distal end side link hub in the defined posture. The positioning member is normally dismounted, and is mounted when necessary. Since the positioning portion is provided to at least one link member of the proximal side end link member, the distal side end link member, and the intermediate link member, positioning work for mounting the positioning member between a plurality of the positioning portions and positioning the distal end side link hub in the defined posture can be performed from the outer peripheral side of the link mechanism. Therefore, even when the internal space of each link mechanism is narrow, it is possible to easily perform the positioning work.

Moreover, even when an end effector is mounted on the distal end side link hub in a state where a part thereof projects into the internal space of each link mechanism, or a cable connected to the end effector is present in the internal space, it is possible to easily perform the positioning work. Therefore, for example, in the case of performing initialization work for registering the positional relationship between the posture of the distal end side link hub and the posture control drive source in advance, the workability of the initialization work is improved.

In the present invention, the positioning portion may be provided to the intermediate link member. Examples of the link actuating device include a rotation symmetry type and a mirror symmetry type. The directions in which the proximal side and distal side end link members are mounted are changed depending on these types, but the direction in which the intermediate link member is mounted is not changed depending on these types. Thus, when the positioning portion is provided to the intermediate link member, components can be shared by the rotation symmetry type and the mirror symmetry type. In addition, when the positioning portion is provided to the intermediate link member, the work for mounting the positioning member between a plurality of the positioning portions can be performed in a wide space where interference with the proximal side end link member or the distal side end link member is less likely to occur, and therefore, the workability is improved.

The positioning portion may be a through hole into which the positioning member can be inserted, and a central axis of the through hole may pass through a plane including a point at which a central axis of a revolute pair between the proximal side end link member and the intermediate link member of each link mechanism and a central axis of a revolute pair between the distal side end link member and the intermediate link member of each link mechanism intersect each other, and may intersect a point of intersection between a central axis of the proximal end side link hub and a central axis of the distal end side link hub.

When the central axis of the positioning portion is located as described above, the intermediate link member can have a symmetrical shape between the proximal end side and the distal end side, and also, the shapes of the intermediate link members of the respective link systems can be the same. Therefore, the mass productivity is improved. In addition, in a state where the operation amounts of the respective link mechanisms are equal, the planes on which the central axes of the positioning portions in the respective link mechanisms are located are the same. Thus, positioning in a state where the operation amounts of the respective link mechanisms are equal can be more easily performed, and therefore, the workability is improved.

The positioning member may include two or more positioning member divided bodies each of which can be inserted into the one positioning portion, and the two or more positioning member divided bodies may be coupled to each other in a fixed state via a connection member. When the positioning member has the above configuration, the work for mounting the positioning member can be more easily and reliably performed. Therefore, the distal end side link hub can be accurately positioned in the defined posture.

One positioning member divided body of the two or more positioning member divided bodies may be formed so as to be integrated with the connection member. By forming the one positioning member divided body so as to be integrated with the connection member in advance, the need to couple the positioning member divided body to the connection member while supporting the connection member with one hand is eliminated. Therefore, the workability of the work for mounting the positioning member is improved.

The positioning member may be detachably mounted between the two positioning portions provided to the adjacent two intermediate link members, respectively. In this case, since the positioning portion is located on the outer peripheral portion of each link mechanism, the workability of the work for mounting the positioning member is further improved. In addition, even when an end effector and a cable are disposed in the internal space of each link mechanism, the work for mounting the positioning member can be performed without interfering with the end effector and the cable.

Another positioning portion composed of a through hole or a recess may be provided to another intermediate link member other than the adjacent two intermediate link members, and the positioning member may have a projection portion configured to restrict postures of the adjacent two intermediate link members and such another intermediate link member relative to each other by being inserted into such another positioning portion. With this configuration, by inserting the projection portion into such another positioning portion of such another intermediate link member, and mounting the positioning member between the two positioning portions provided to the adjacent two intermediate link members, respectively, the postures of the three intermediate link members are restricted relative to each other. Since only the one positioning member is used, the workability is good. In addition, since the postures of the three intermediate link members are restricted at the same time, more accurate positioning is possible.

In the present invention, the posture control drive source may be a rotary actuator, and the storage unit may store therein a rotation angle of the posture control drive source when torque is applied in a state where the distal end side link hub is in an origin posture. The origin posture means a posture in which the central axis of the proximal end side link hub and the central axis of the distal end side link hub are on the same line. With this configuration, by using the rotation angle of the posture control drive source stored in the storage unit for posture control of the distal end side link hub, the influence of backlash of mechanical elements used in the link actuating device, etc., is reduced. As a result, the rigidity can be improved, and thus, the accuracy of positioning is improved.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 7 is a cross-sectional view taken along a line VII-VII in FIG. 3;

DESCRIPTION OF EMBODIMENTS

First Embodiment

Figure 1:
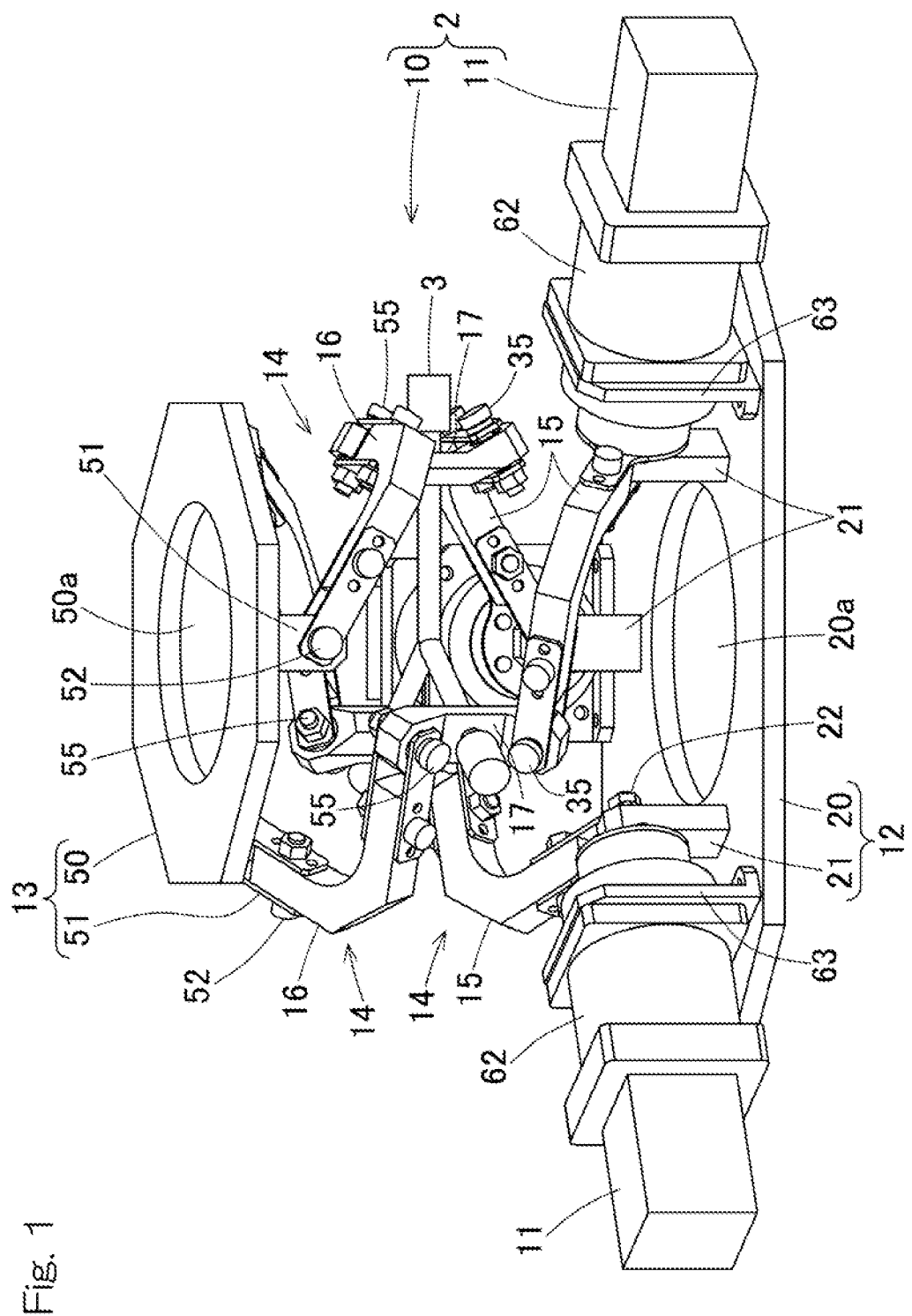
FIG. 1 is a perspective view showing a state when a link actuating device body of a link actuating device according to a first embodiment of the present invention is positioned in an origin posture by using a positioning member.
Figure 2:
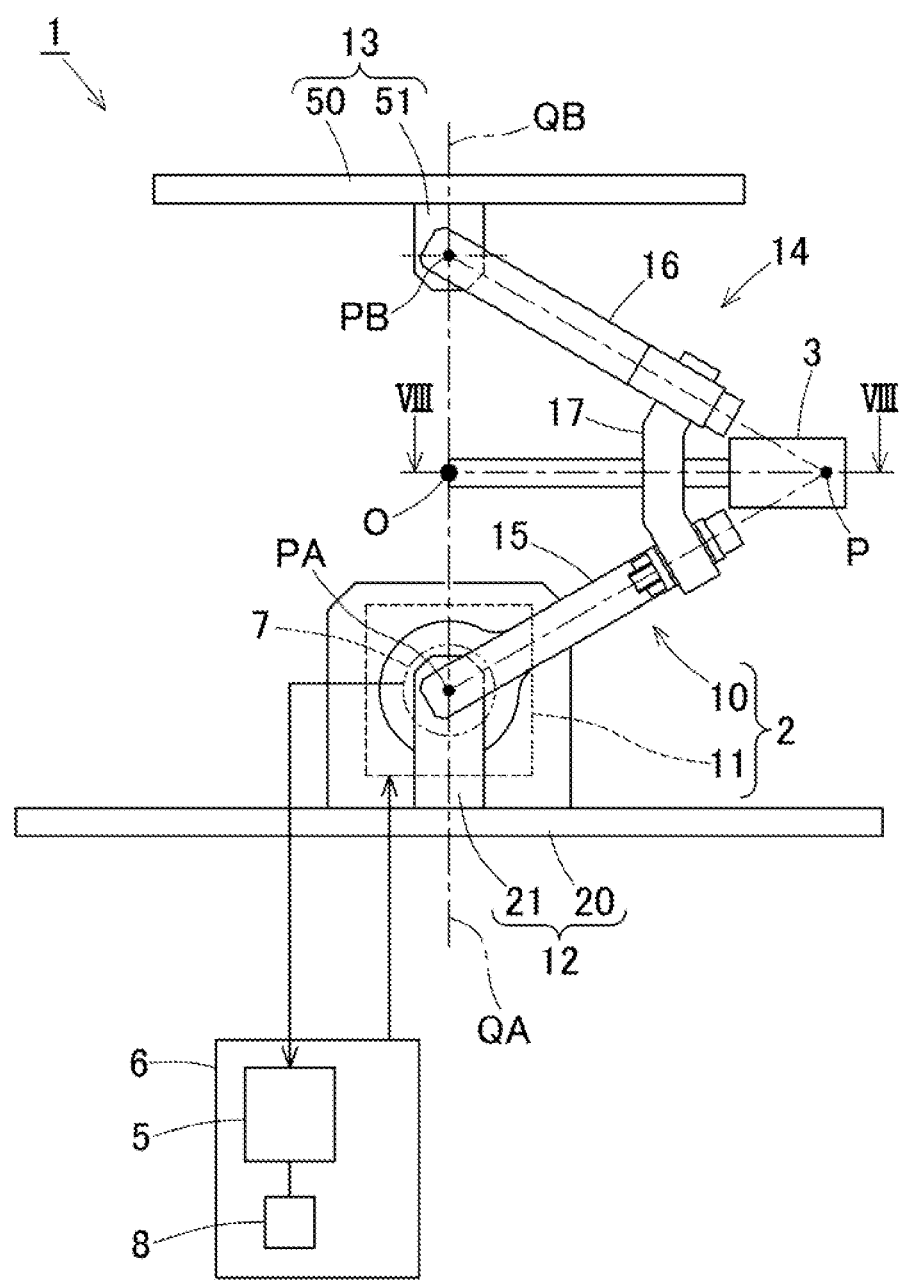
FIG. 2 is a diagram in which a block diagram of a control system is added to a front view in which a part of the link actuating device body and a part of the positioning member are omitted.

FIG. 1 is a perspective view showing a state when a link actuating device body of a link actuating device according to a first embodiment of the present invention is positioned in an origin posture by using a positioning member. FIG. 2 is a diagram in which a block diagram of a control system is added to a front view in which a part of the link actuating device body and a part of the positioning member are omitted.

As shown in FIG. 2, the link actuating device 1 includes: a link actuating device body 2; a positioning member 3 that is used when the link actuating device body 2 is positioned in an origin posture described later; and a control device 5 that controls the posture of the link actuating device body 2. In this example, the control device 5 is provided in a controller 6. However, the control device 5 may be provided separately from the controller 6.

<Link Actuating Device Body>

Figure 3:
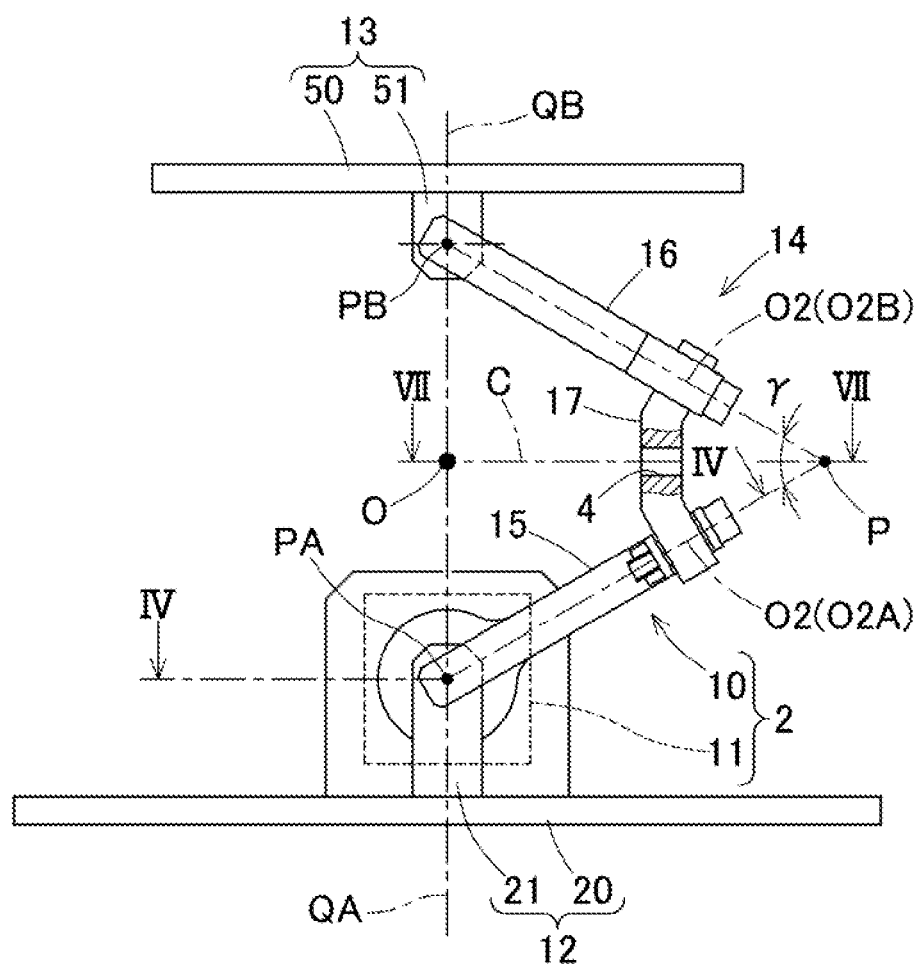
FIG. 3 is a front view in which a part of the link actuating device body is omitted.

The link actuating device body 2 will be described. FIG. 3 shows a state where the link actuating device body 2 is not positioned in the origin posture. The link actuating device body 2 includes a parallel link mechanism 10 and posture control drive sources 11 that operate the parallel link mechanism 10. The parallel link mechanism 10 couples a distal end side link hub 13 to a proximal end side link hub 12 via three link mechanisms 14 such that the posture of the distal end side link hub 13 can be changed relative to the proximal end side link hub 12. In FIG. 2 and FIG. 3, only one link mechanism 14 is shown. The number of link mechanisms 14 may be four or more.

Each link mechanism 14 includes a proximal side end link member 15, a distal side end link member 16, and an intermediate link member 17, and forms a quadric chain link mechanism composed of four revolute pairs. The proximal side and distal side end link members 15 and 16 each have an L-shape. The proximal side end link member 15 has one end rotatably coupled to the proximal end side link hub 12. The distal side end link member 16 has one end rotatably coupled to the distal end side link hub 13. The proximal side and distal side end link members 15 and 16 have the other ends rotatably coupled to opposite ends of the intermediate link member 17, respectively.

The parallel link mechanism 10 is formed by combining two spherical link mechanisms. Specifically, the central axes of the revolute pairs between the proximal end side link hub 12 and the proximal side end link member 15 and the central axes O2 (O2A) of the revolute pairs between the proximal side end link member 15 and the intermediate link member 17 intersect each other at a proximal end side spherical link center PA. The central axes of the revolute pairs between the distal end side link hub 13 and the distal side end link member 16 and the central axes O2 (O2B) of the revolute pairs between the distal side end link member 16 and the intermediate link member 17 intersect each other at a distal end side spherical link center PB. The central axes O2A and O2B of the revolute pairs between the end link members 15 and 16 and the intermediate link member 17 may form a certain cross angle γ, or may be parallel. In this embodiment, the central axes O2A and O2B form a cross angle γ and intersect each other at a point P or cross point P.

Figure 4:
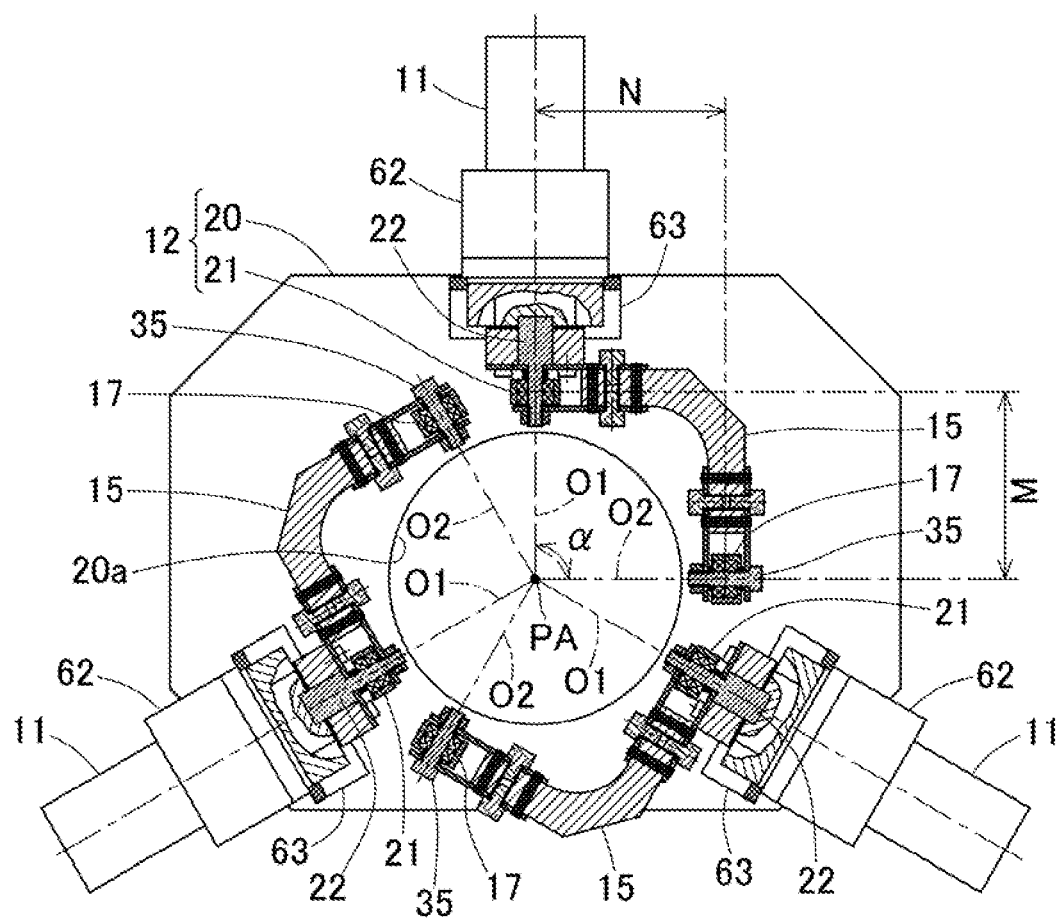
FIG. 4 is a cross-sectional view taken along a line IV-PA-IV in FIG. 3.

FIG. 4 is an IV-PA-IV cross-sectional view of FIG. 3, and shows a relationship between the central axes O1 of the revolute pairs between the proximal end side link hub 12 and the proximal side end link members 15, the central axes O2 of the revolute pairs between the intermediate links 17 and the proximal side end link members 15, and the proximal end side spherical link center PA. That is, the point at which the central axes O1 and the central axes O2 intersect each other is the spherical link center PA. The shapes and the positional relationship of the distal end side link hub 13 and the distal side end link members 16 are the same as in FIG. 4 (not shown). In the example in FIG. 4, the angle α formed by the central axis O1 of each revolute pair between the link hub 12 (13) and the end link member 15 (16) and the central axis O2 of each revolute pair between the end link member 15 (16) and the intermediate link member 17 is 90°, but may be an angle other than 90°.

At the proximal end side and the distal end side, the distances M from the spherical link centers PA and PB to central points of the revolute pairs between the link hubs 12 and 13 and the end link members 15 and 16 are the same. In this embodiment, at the proximal end side and the distal end side, the distances N from the spherical link centers PA and PB to central points of the revolute pairs between the end link members 15 and 16 and the intermediate link members 17 are also the same. The distances N may be different between the proximal end side and the distal end side. The central points of the revolute pairs are the central points in the width directions of the end link members 15 and 16 along the central axes of the revolute pairs.

Figure 6:
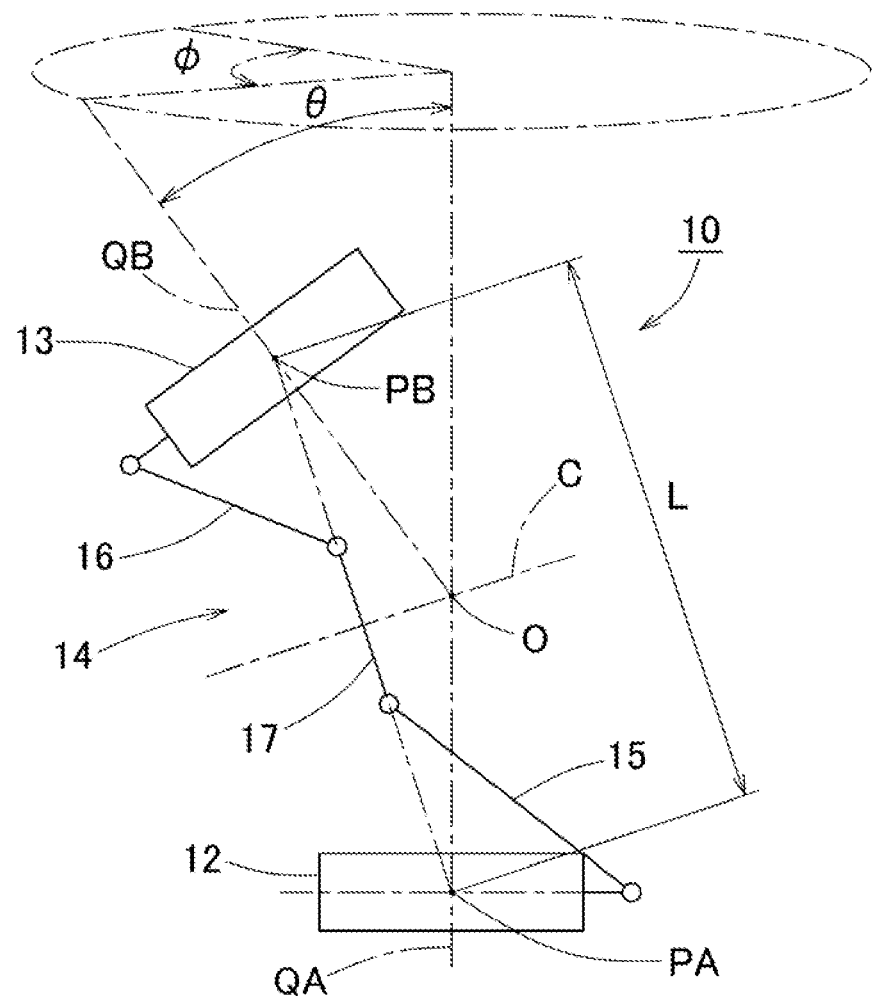
FIG. 6 is a diagram representing one link mechanism of the link actuating device with straight lines.

The three link mechanisms 14 have a geometrically identical configuration. The geometrically identical configuration means that, as shown in FIG. 6, a geometric model depicted with straight lines representing the link members 15, 16, and 17, that is, a model depicted with the revolute pairs and straight lines connecting these revolute pairs, represents a shape in which the proximal end side portion thereof and the distal end side portion thereof are symmetrical with each other with respect to the center portion of the intermediate link member 17. FIG. 6 is a diagram showing one link mechanism 14 depicted with straight lines. The parallel link mechanism 10 according to this embodiment is of a rotation symmetry type, and has a positional configuration in which the positional relationship between a proximal end side portion including the proximal end side link hub 12 and the proximal side end link member 15 and a distal end side portion including the distal end side link hub 13 and the distal side end link member 16 is in rotation symmetry relative to a center line C of the intermediate link member 17. The center portion of each intermediate link member 17 is located on a common orbital circle.

The proximal end side link hub 12, the distal end side link hub 13, and the three link mechanisms 14 form a two-degrees-of-freedom mechanism in which the distal end side link hub 13 is rotatable about two mutually orthogonal axes, relative to the proximal end side link hub 12. In other words, the two-degrees-of-freedom mechanism allows the distal end side link hub 13 to rotate with two degrees of freedom to change its posture, relative to the proximal end side link hub 12. This two-degrees-of-freedom mechanism is compact in size, but can achieve a wide range of movement for the distal end side link hub 13 relative to the proximal end side link hub 12.

For example, straight lines that pass through the spherical link centers PA and PB and that intersect the central axes O1 (FIG. 4) of the respective revolute pairs between the link hubs 12 and 13 and the end link members 15 and 16 at a right angle are defined as central axes QA and QB of the link hubs 12 and 13. In this case, the maximum value of a bending angle θ (FIG. 6) between the central axis QA of the proximal end side link hub 12 and the central axis QB of the distal end side link hub 13 can be about ±90°. In addition, a turning angle φ (FIG. 6) of the distal end side link hub 13 relative to the proximal end side link hub 12 can be set in the range of 0° to 360°. The bending angle θ is a vertical angle formed when the central axis QB of the distal end side link hub 13 is inclined relative to the central axis QA of the proximal end side link hub 12. The turning angle φ is a horizontal angle formed when the central axis QB of the distal end side link hub 13 is inclined relative to the central axis QA of the proximal end side link hub 12.

The posture of the distal end side link hub 13 relative to the proximal end side link hub 12 is changed with the point of intersection O between the central axis QA of the proximal end side link hub 12 and the central axis QB of the distal end side link hub 13 as a rotation center. FIG. 1 to FIG. 3 show a state where the central axis QA of the proximal end side link hub 12 and the central axis QB of the distal end side link hub 13 are on the same line. Even when the posture is changed, the distance L (FIG. 6) between the proximal and distal end side spherical link centers PA and PB does not change.

When each link mechanism 14 satisfies the following conditions 1 to 5, the proximal end side portion including the proximal end side link hub 12 and the proximal side end link member 15, and the distal end side portion including the distal end side link hub 13 and the distal side end link member 16 move in the same manner due to the geometrical symmetry. Thus, when rotation is transmitted from the proximal end side to the distal end side, the parallel link mechanism 10 serves as a constant velocity universal joint in which the proximal end side and the distal end side are rotated by the same angle at equal speeds.

Condition 1: The angles α formed by the central axes O1 of the revolute pairs between the link hubs 12 and 13 and the end link members 15 and 16 and the central axes O2 of the revolute pairs between the end link members 15 and 16 and the intermediate link member 17, and the distances M from the spherical link centers PA and PB to the central points of the respective revolute pairs between the link hubs 12 and 13 and the end link members 15 and 16 are equal at each link mechanism 14.

Condition 2: The central axes O1 of the revolute pairs between the link hubs 12 and 13 and the end link members 15 and 16 and the central axes O2 of the revolute pairs between the end link members 15 and 16 and the intermediate link member 17 intersect each other at the spherical link centers PA and PB at the proximal end side and the distal end side.

Condition 3: The geometrical shapes of the proximal side end link member 15 and the distal side end link member 16 are the same.

Condition 4: The geometrical shapes of the proximal end side portion and the distal end side portion of the intermediate link member 17 are the same.

Condition 5: The angular positional relationships between the intermediate link member 17 and the end link members 15 and 16 with respect to the symmetry plane of the intermediate link member 17 are identical between the proximal end side and the distal end side.

As shown in FIG. 1 to FIG. 3, the proximal end side link hub 12 includes a flat plate-shaped proximal end member 20 and three rotation shaft coupling members 21 provided so as to be integrated with the proximal end member 20. For example, a circular through hole 20a (FIG. 1) is formed in a center portion of the proximal end member 20, and the three rotation shaft coupling members 21 are disposed equidistantly in the circumferential direction around the through hole 20a. The center of the through hole 20a is located on the central axis QA of the proximal end side link hub 12. A rotation shaft 22 having an axis that intersects the central axis QA of the proximal end side link hub 12 is rotatably coupled to each rotation shaft coupling member 21. One end of the proximal side end link member 15 is coupled to the rotation shaft 22.

Figure 5:
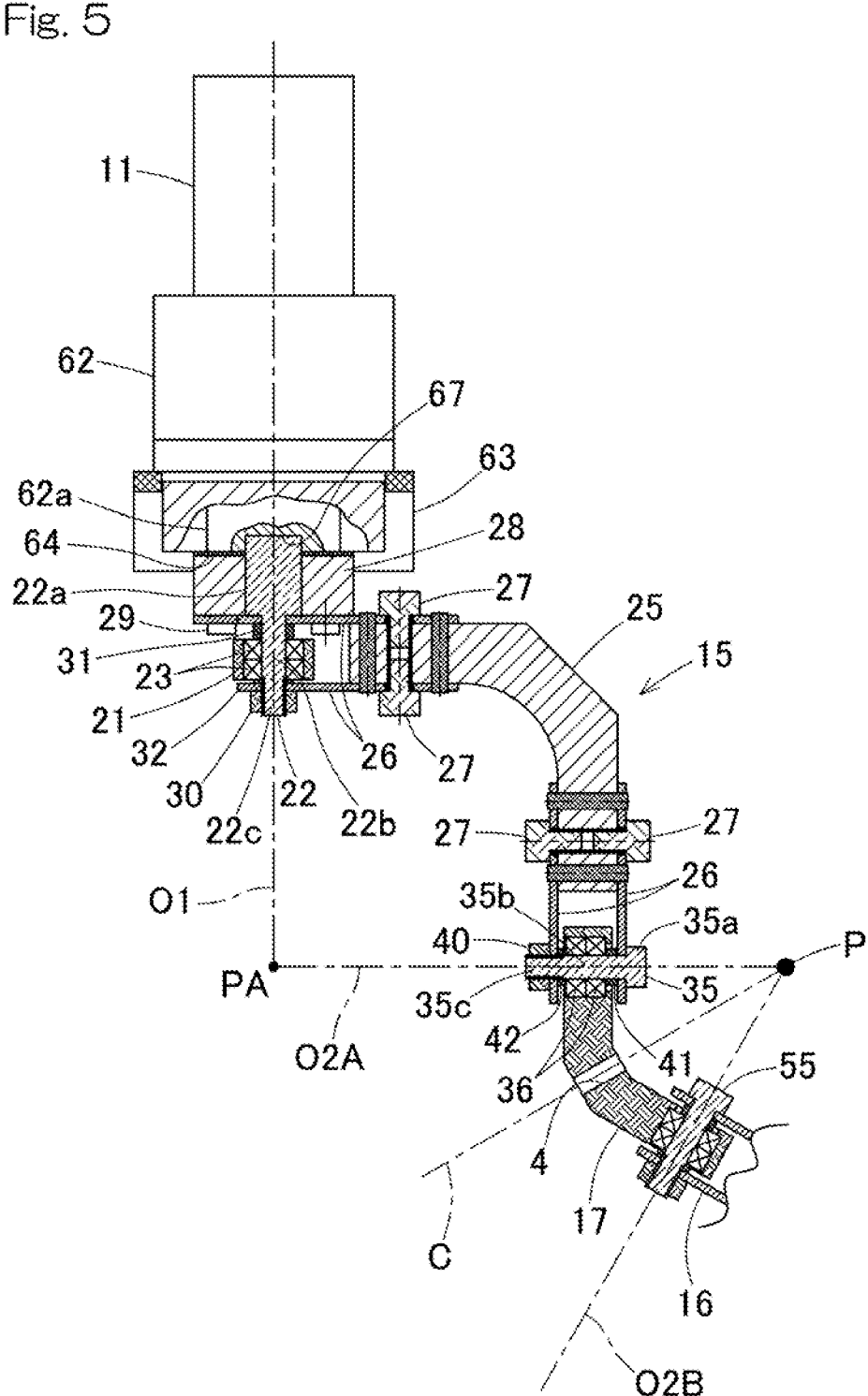
FIG. 5 is a partially enlarged view of FIG. 4 showing an intermediate link member in a developed state.

FIG. 5 is a diagram showing one proximal side end link member 15 and the areas surrounding both ends thereof. The rotation shaft 22 has a large-diameter portion 22a, a small-diameter portion 22b, and an external thread portion 22c and is rotatably supported at the small-diameter portion 22b by the rotation shaft coupling member 21 via two bearings 23. Each bearing 23 is a ball bearing such as a deep groove ball bearing and an angular contact ball bearing. These bearings 23 are mounted on the inner periphery of the rotation shaft coupling member 21 in a state of being fitted thereon, and are fixed by a method such as press-fit, adhesion, and crimping. The same applies to the type of and a mounting method for bearings provided to other revolute pair sections.

The rotation shaft 22 is coaxially arranged at the large-diameter portion 22a thereof on an output shaft 62a of a speed reduction mechanism 62. The arrangement structure thereof will be described later. In addition, the one end of the proximal side end link member 15 is coupled to the rotation shaft 22 such that the proximal side end link member 15 is rotatable integrally with the rotation shaft 22.

The proximal side end link member 15 according to this embodiment includes one L-shaped curved body 25 and two pairs of rotation shaft support plates 26 connected to both ends of the curved body 25. The pair of rotation shaft support plates 26 at each end are fixed to the outer surface and the inner surface of the curved body 25 by bolts 27, respectively. The curved body 25 is, for example, a cast product of a metal material. Each rotation shaft support plate 26 is, for example, a plate material having a constant thickness such as a metal plate. The distal side end link member 16 also has the same configuration as the proximal side end link member 15.

The rotation shaft 22 is coupled to the one end of the proximal side end link member 15 as described below. Specifically, the rotation shaft coupling member 21 is disposed between the pair of rotation shaft support plates 26, 26 at the one-end side of the proximal side end link member 15, and the small-diameter portion 22b of the rotation shaft 22 is inserted through the inner rings of the bearings 23 and holes formed in the pair of rotation shaft support plates 26, 26, respectively. In this state, the proximal side end link member 15 and the output shaft 62a of the speed reduction mechanism 62 are fixed to each other by bolts 29 via a spacer 28 fitted to the outer periphery of the large-diameter portion 22a of the rotation shaft 22, and a nut 30 is screwed to the external thread portion 22c of the rotation shaft 22 that projects radially inward of the rotation shaft support plate 26 on the inner side. Spacers 31 and 32 are interposed between the inner rings of the bearings 23 and the pair of rotation shaft support plates 26, 26, and thus, a preload is applied to the bearings 23 when the nut 30 is screwed.

A rotation shaft 35 is rotatably coupled to one end of the intermediate link member 17 and is coupled to the other end of the proximal side end link member 15. Similar to the rotation shaft 22 at the link hub 12, the rotation shaft 35 at the intermediate link member 17 has a large-diameter portion 35a, a small-diameter portion 35b, and an external thread portion 35c and is rotatably supported at the small-diameter portion 35b by the one end of the intermediate link member 17 via two bearings 36.

Specifically, the one end of the intermediate link member 17 is disposed between the pair of rotation shaft support plates 26, 26 at the other-end side of the proximal side end link member 15, and the small-diameter portion 35b of the rotation shaft 35 is inserted through the inner rings of the bearings 36 and through holes formed in the pair of rotation shaft support plates 26, 26, respectively. In this state, a nut 40 is screwed to the external thread portion 35c of the rotation shaft 35 that projects radially inward of the rotation shaft support plate 26 on the inner side. Spacers 41 and 42 are interposed between the inner rings of the bearings 36 and the pair of rotation shaft support plates 26, 26, and thus, a preload is applied to the bearings 36 when the nut 40 is screwed.

As shown in FIG. 1 to FIG. 3, the distal end side link hub 13 includes a flat plate-shaped distal end member 50 and three rotation shaft coupling members 51 provided so as to be integrated with the distal end member 50. For example, a circular through hole 50a (FIG. 1) is formed in a center portion of the distal end member 50, and the three rotation shaft coupling members 51 are disposed equidistantly in the circumferential direction around the through hole 50a. The center of the through hole 50a is located on the central axis QB of the distal end side link hub 13. A rotation shaft 52 (FIG. 1) having an axis that intersects the central axis QB of the distal end side link hub 13 is rotatably coupled to each rotation shaft coupling member 51. One end of the distal side end link member 16 is coupled to the rotation shaft 52.

A rotation shaft 55 (FIG. 1) is rotatably coupled to the other end of the intermediate link member 17 and is coupled to the other end of the distal side end link member 16. The rotation shaft 52 at the distal end side link hub 13 and the rotation shaft 55 at the intermediate link member 17 also have the same shape as the rotation shaft 35 and are rotatably coupled to the rotation shaft coupling member 51 and the other end of the intermediate link member 17, respectively, via two bearings.

Each posture control drive source 11 is a rotary actuator (motor) provided with the speed reduction mechanism 62, and is mounted on the upper surface of the proximal end member 20 of the proximal end side link hub 12 so as to be coaxial with the rotation shaft 22 and face outward with respect to the three link mechanisms 14. The posture control drive source 11 and the speed reduction mechanism 62 are integrally provided, and the speed reduction mechanism 62 is fixed to the proximal end member 20 by a motor fixing member 63. In this example, the posture control drive source 11 is provided to each of the three link mechanisms 14. However, when the posture control drive source 11 is provided to each of at least two of the three link mechanisms 14, the posture of the distal end side link hub 13 relative to the proximal end side link hub 12 can be determined.

In FIG. 5, the speed reduction mechanism 62 is of a flange output type and has the large-diameter output shaft 62a. The tip end surface of the output shaft 62a forms a flat flange surface 64 orthogonal to the center line of the output shaft 62a. The output shaft 62a is connected to the rotation shaft support plate 26 of the proximal side end link member 15 via the spacer 28 by the bolts 29. The large-diameter portion 22a of the rotation shaft 22 at a revolute pair section between the proximal end side link hub 12 and the proximal side end link member 15 is fitted into an inner-diameter groove 67 provided in the output shaft 62a of the speed reduction mechanism 62.

<Positioning Portion and Positioning Member>

As shown in FIG. 3, FIG. 5, and FIG. 7, a positioning portion 4 for positioning the link actuating device body 2 in an origin posture is provided to each intermediate link member 17. The origin posture means a posture in which the central axis QA of the proximal end side link hub 12 and the central axis QB of the distal end side link hub 13 are on the same line as in FIG. 3.

The positioning portion 4 is composed of a through hole (for example, a circular shape) into which a later-described positioning member divided body 103 can be inserted. The central axis of the through hole is located so as to coincide with the center line C of the intermediate link member 17. That is, the central axis of the through hole is located on a straight line that connects: the cross point P at which the central axis O2A of the revolute pair between the proximal side end link member 15 and the intermediate link member 17 and the central axis O2B of the revolute pair between the distal side end link member 16 and the intermediate link member 17 at each link mechanism 14 intersect each other; and the point of intersection O between the central axis QA of the proximal end side link hub 12 and the central axis QB of the distal end side link hub 13.

Figure 8A:
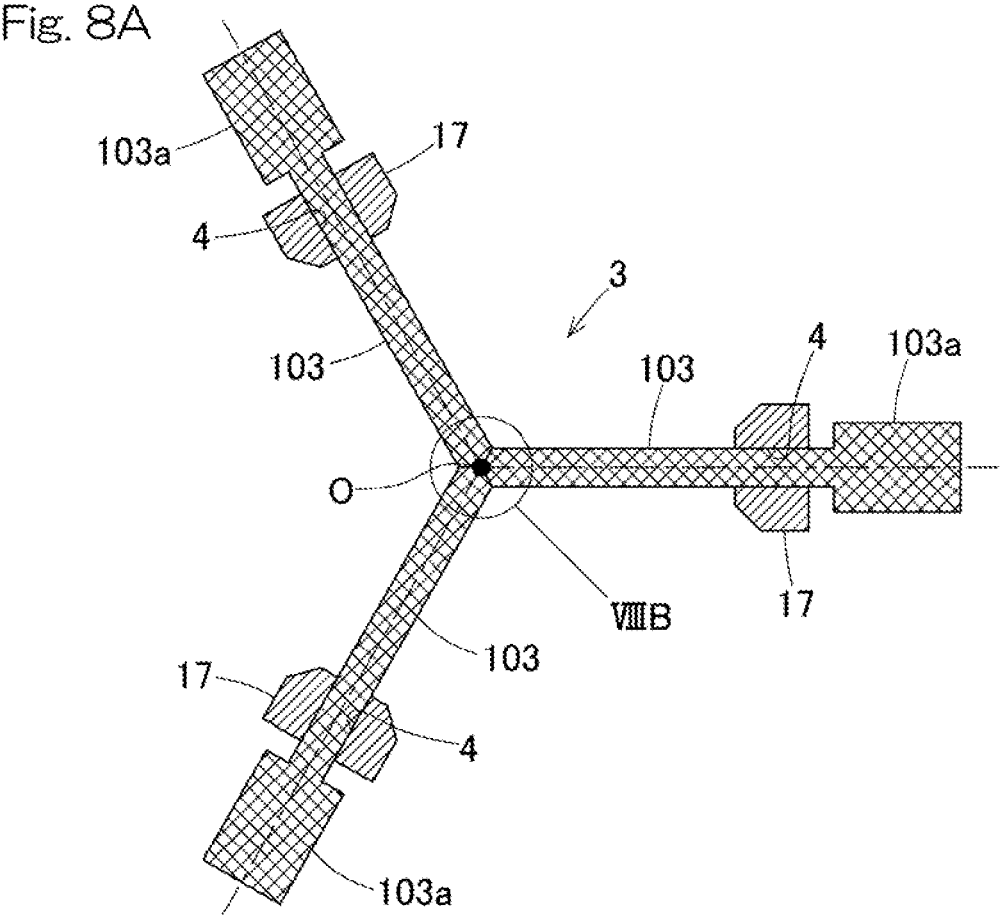
FIG. 8A is a cross-sectional view taken along a line VIII-VIII in FIG. 2.

As shown in FIG. 8A, the positioning member 3 is divided into three positioning member divided bodies 103. Each positioning member divided body 103 has a bar shape that allows the positioning member divided body 103 to be inserted into the positioning portion 4 composed of a through hole, and a large-diameter knob portion 103a is formed at a proximal end thereof.

Figure 8B:
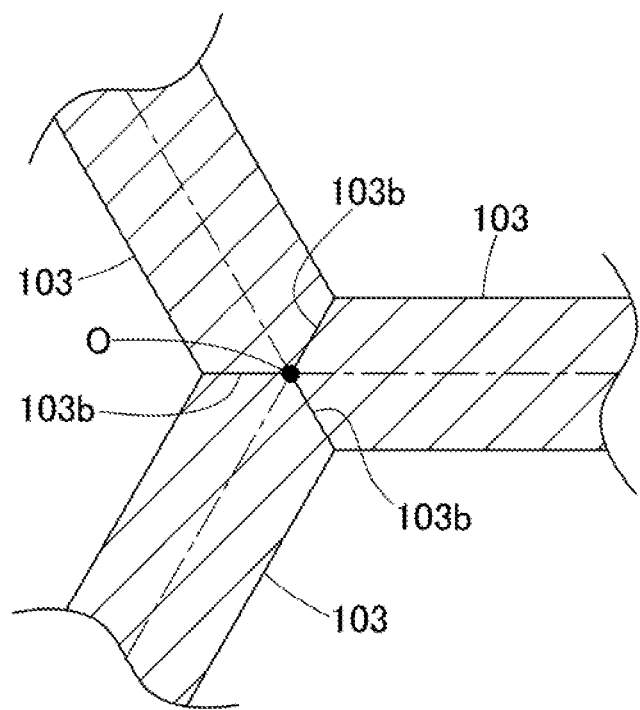
FIG. 8B is an enlarged view of a part VIIIB in FIG. 8A.

As shown in FIG. 8B, a tip end portion of each positioning member divided body 103 is formed such that a planar shape thereof is a mountain shape. When the three positioning member divided bodies 103 are inserted into each positioning portion 4 such that the tip end point thereof is located at the point of intersection O, tip end surfaces 103b of the adjacent positioning member divided bodies 103 are brought into contact with each other. Accordingly, each positioning member divided body 103 is coupled in a fixed state such that the positioning member divided body 103 does not move, and the posture of each intermediate link member 17 is restricted. By restricting the posture of each intermediate link member 17 as described above, the link actuating device body 2 is positioned in the origin posture.

In the example of FIG. 8A and FIG. 8B, the distal end surfaces 103b of the respective positioning member divided bodies 103 are brought into planar contact with each other, but the tip end surfaces of the respective positioning member divided bodies 103 may be stepped such that the tip end surfaces are brought into mesh with each other (not shown).

The positioning in the origin posture is performed by pinching the knob portion 103a of each positioning member divided body 103 of the positioning member 3 with a hand and then inserting the positioning member divided body 103 into the positioning portion 4 of the intermediate link member 17 from the outer peripheral side of the link mechanism 14. That is, work for positioning in the origin posture can be performed from the outer peripheral side of the link mechanism 14. Therefore, even when the internal space of each link mechanism 14 is narrow, it is possible to easily perform the positioning work.

Even when an end effector is mounted on the distal end side link hub 13 in a state where a part thereof projects into the internal space of each link mechanism 14, or a cable connected to the end effector is present in the internal space, it is possible to easily perform the positioning work. Since the positioning portion 4 is provided to each intermediate link member 17, work for mounting the positioning member 3 between a plurality of the positioning portions 4 can be performed in a wide space where interference with the proximal side end link member 15 or the distal side end link member 16 is less likely occur. Therefore, the workability is good.

The central axis of the positioning portion 4 composed of a through hole is located so as to coincide with the center line C of the intermediate link member 17. That is, the central axis of the positioning portion 4 passes through a plane including the cross point P at which the central axis O2A of the revolute pair between the proximal side end link member 15 and the intermediate link member 17 and the central axis O2B of the revolute pair between the distal side end link member 16 and the intermediate link member 17 in each link mechanism 14 intersect each other. Therefore, the intermediate link member 17 can have a symmetrical shape between the proximal end side and the distal end side, and therefore, the mass productivity is improved.

In a state where the operation amounts of the respective link mechanisms 14 are equal as in the origin posture, the planes on which the central axes of the positioning portions 4 in the respective link mechanisms 14 are located are the same. Thus, positioning in a state where the operation amounts of the respective link mechanisms 14 are equal can be more easily performed, and therefore, the workability is improved.

<Posture Control of Link Actuating Device>

In the link actuating device 1, the controller 6 is operated to rotationally drive each posture control drive source 11, thereby changing the angle of each proximal side end link member 15. Accordingly, the posture of the distal end side link hub 13 relative to the proximal end side link hub 12 is changed. The rotational drive of each posture control drive source 11 may be performed manually with an operation tool (not shown) provided to the controller 6, or through automatic control by the control device 5 such that an amount set by a setting device (not shown) provided in the controller 6 is achieved. The control device 5 is of a numerical control type by a computer, and performs position control for controlling the operation amount of each posture control drive source 11 and torque control for controlling the torque of each posture control drive source 11.

When controlling the posture of the distal end side link hub 13 through automatic control, first, a control target value of a rotation angle βn of each proximal side end link member 15 is calculated in accordance with a posture of the distal end side link hub 13 that is set by the setting device. Calculation of the rotation angle βn is performed by inversely converting Equation 1 below. The inverse conversion means conversion through which the rotation angle βn of the proximal side end link member 15 is calculated from the bending angle θ (FIG. 6) between the central axis QA of the proximal end side link hub 12 and the central axis QB of the distal end side link hub 13 and the turning angle φ (FIG. 6) of the output side link hub 13 relative to the proximal end side link hub 12.

$$\cos(\theta/2)\sin\beta n - \sin(\theta/2)\sin(\varphi+\delta n)\cos\beta n + \sin(\gamma/2) = 0 \quad \text{(Equation 1)}$$

Here, γ (FIG. 3) is the angle formed by the central axis O2A of the revolute pair between the proximal side end link member 15 and the intermediate link member 17 and the central axis O2B of the revolute pair between the distal side end link member 16 and the intermediate link member 17.

δn is the separation angle in the circumferential direction of each proximal side end link member 15 relative to the proximal side end link member 15 that serves as a reference.

After the control target value of the rotation angle βn is calculated, position control of each posture control drive source 11 is performed. That is, using a signal from a posture detector 7 (FIG. 2) that detects the posture of the distal end side link hub 13, feedback-control of each posture control drive source 11 is performed such that the rotation angle βn is rendered to be the control target value. The bending angle θ and the turning angle φ, and the rotation angle βn interrelate with each other, and one value can be derived from the other. The posture of the distal end side link hub 13 is determined by performing position control of each posture control drive source 11 as described above. The posture detector 7 detects the posture of the distal end side link hub 13, for example, by detecting the rotation angle βn of each proximal side end link member 15. The posture detector 7 is composed of, for example, an absolute encoder.

In the link actuating device body 2, there arises rattling due to backlash of mechanical elements incorporated therein or the like. If each posture control drive source 11 is controlled while ignoring the existence of this rattling, an error will occur in the posture of the distal end side link hub 13 by the amount of the rattling. In order to eliminate this error, initial setting of an origin position, which is rendered to be a reference for operation of the posture control drive source 11, is performed in accordance with the magnitude of the rattling. The origin position of the posture control drive source 11 is the operating position of the posture control drive source 11 when the distal end side link hub 13 is in a defined posture. In the case of this embodiment, the defined posture is the origin posture, but may be a posture other than the origin posture. The initial setting of the origin position is performed through the following procedure.

In the first process, the distal end side link hub 13 is positioned in the origin posture. Specifically, as shown in FIG. 8A, each positioning member divided body 103 of the positioning member 3 is inserted into the positioning portion 4 of each intermediate link member 17, and is coupled in a fixed state such that each positioning member divided body 103 does not move. Accordingly, the posture of each intermediate link member 17 is restricted relative to each other, and the distal end side link hub 13 is positioned in the origin posture.

In the second process, a preload or a force that tends to move the backlash in one direction is applied to the link actuating device body 2 in which the distal end side link hub 13 is in the origin posture. Specifically, each posture control drive source 11 is driven through torque control by the control device 5 such that a certain amount of torque is applied in a certain direction. Accordingly, the rattling of each portion of the link actuating device body 2 is eliminated.

In the third process, the operating position of each posture control drive source 11 in a state where the preload is applied to the link actuating device body 2 is stored in a storage unit 8. In the case of this embodiment, the operating position of each posture control drive source 11 is the rotation angle of the posture control drive source 11. The rotation angle of each posture control drive source 11 is detected by the posture detector 7. For example, the rotation angle acquired in the third process is stored as a rotation angle of the posture control drive source 11 corresponding to the rotation angle βn of the proximal side end link member 15 that is obtained by substituting θ=0 and φ=0 in Equation 1 described above.

The rotation angle stored in the storage unit 8 is set as the origin position of each posture control drive source 11, and the value thereof is used for subsequent position control. Accordingly, each posture control drive source 11 can be controlled with the influence of the rattling of the link actuating device body 2 being eliminated. As a result, the posture of the distal end side link hub 13 relative to the proximal end side link hub 12 can be changed with high accuracy. In addition, since the rotation angle of each posture control drive source 11 is detected by the posture detector 7 which is composed of an absolute encoder, even if the power is turned off and turned on again, there is no need to perform initial setting again, and it is possible to easily return to the origin.

Second Embodiment

Figure 9A:
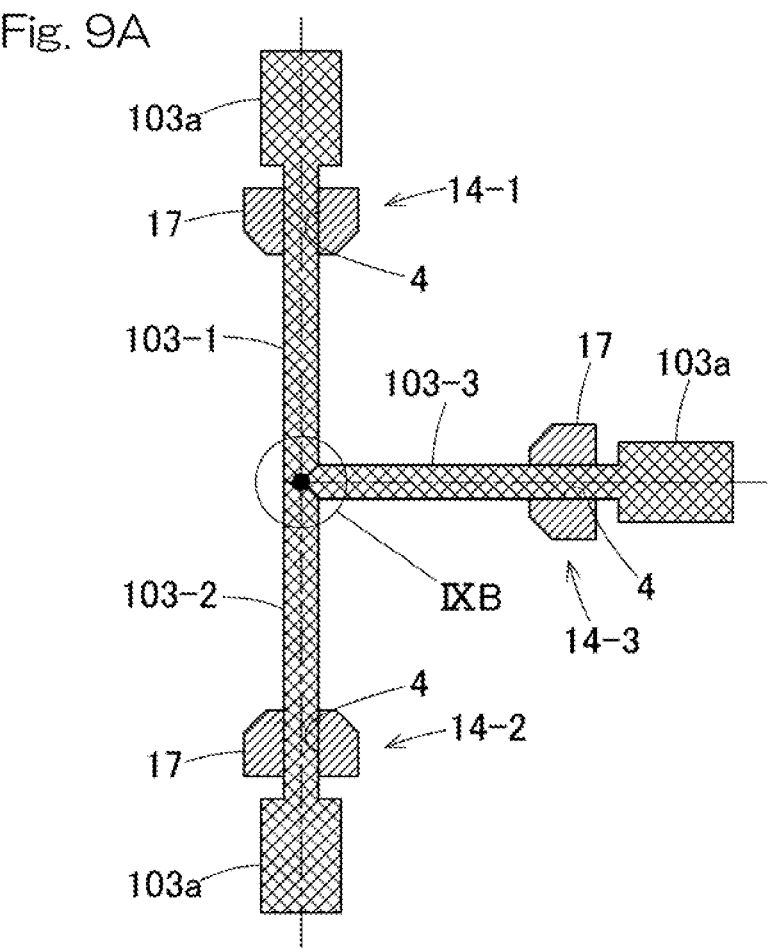
FIG. 9A is a cross-sectional view showing positioning portions and a positioning member of a link actuating device according to a second embodiment of the present invention.
Figure 9B:
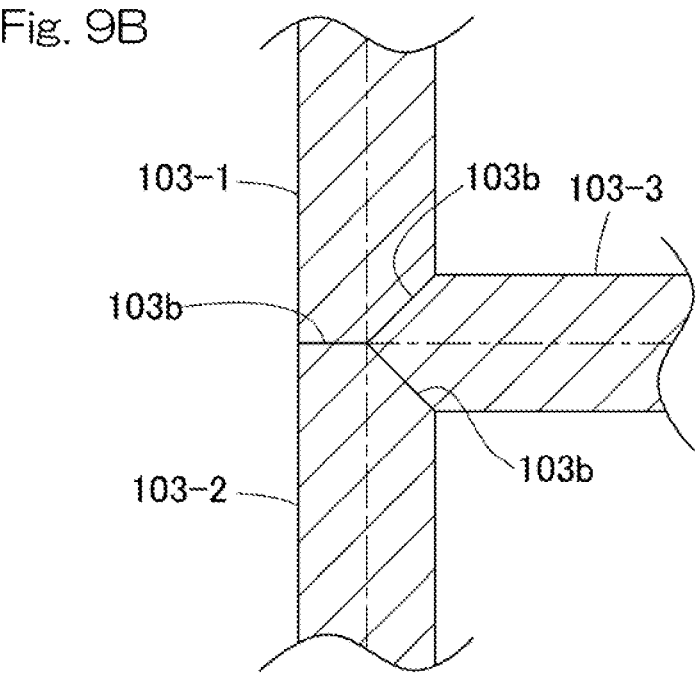
FIG. 9B is an enlarged view of a part IXB in FIG. 9A.

In the first embodiment, the separation angles that are the arrangement angles in the circumferential direction of the respective link mechanisms 14 are equal to each other. However, in a second embodiment shown in FIGS. 9A and 9B, the separation angles of the respective link mechanisms 14 are different from each other. In the example of FIGS. 9A and 9B, two link mechanisms 14-1 and 14-2 are placed 180° relative to each other, and another link mechanism 14-3 is placed 90° relative to these two link mechanisms 14-1 and 14-2. In this case as well, similar to the first embodiment, tip end surfaces 103b of adjacent positioning member divided bodies 103-1, 103-2, and 103-3 are brought into contact with each other, whereby the respective positioning member divided bodies 103-1, 103-2, and 103-3 are coupled in a fixed state such that the positioning member divided bodies 103-1, 103-2, and 103-3 do not move. The other configuration is the same as in the first embodiment, and thus, an overall view of the link actuating device is omitted.

Third Embodiment

Figure 10:
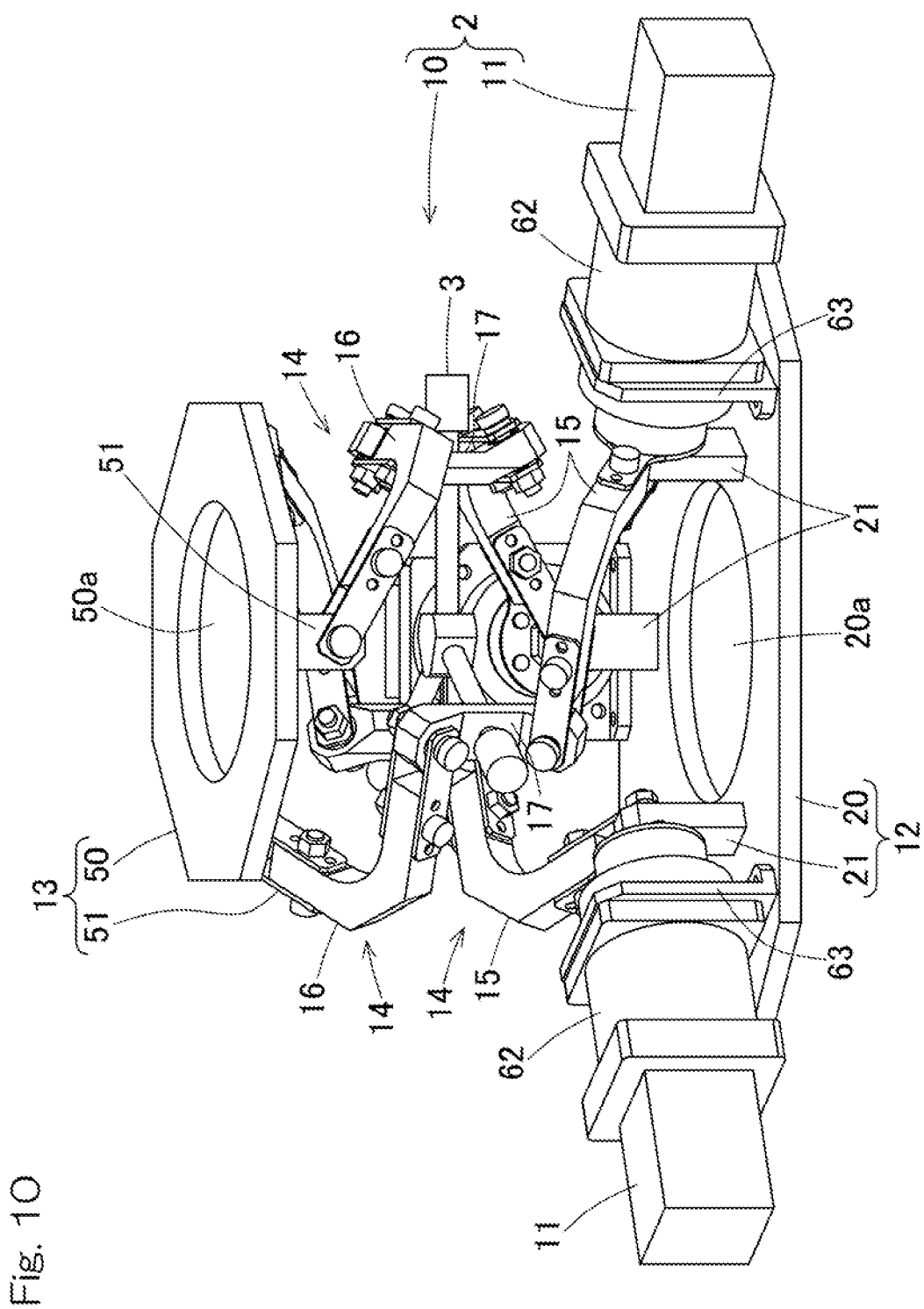
FIG. 10 is a perspective view showing a state when a link actuating device body of a link actuating device according to a third embodiment of the present invention is positioned in an origin posture by using a positioning member.
Figure 11:
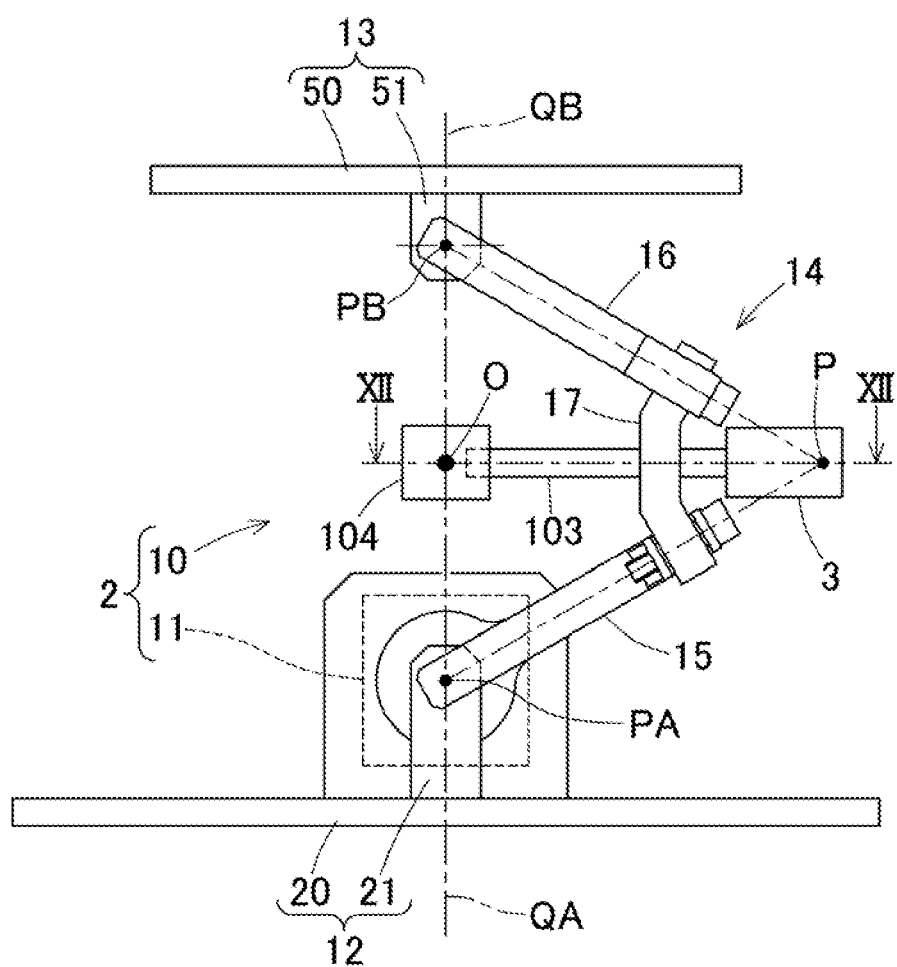
FIG. 11 is a front view in which a part of the link actuating device body and a part of the positioning member are omitted.
Figure 12:
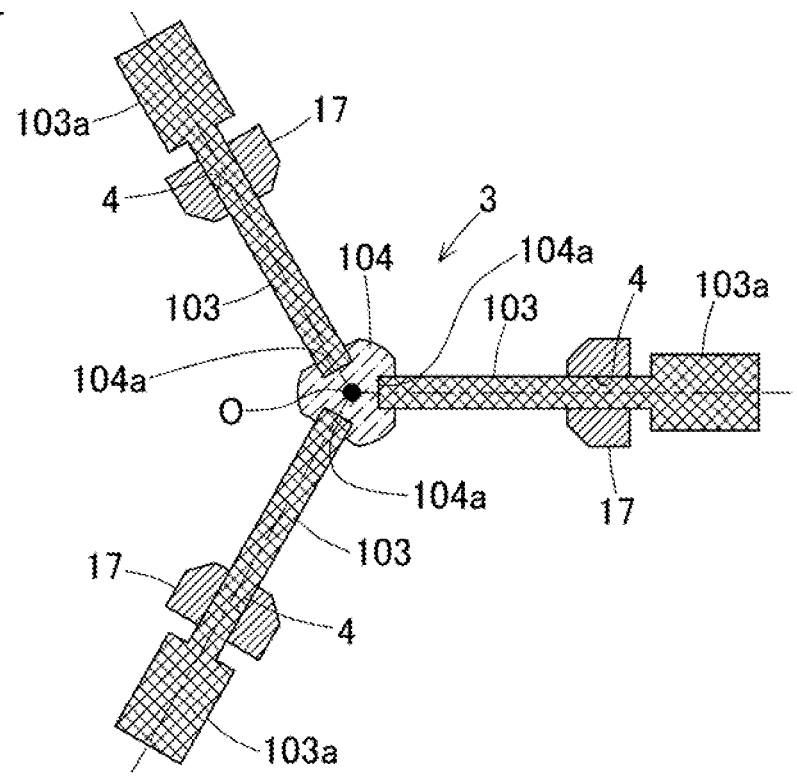
FIG. 12 is a cross-sectional view taken along a line XII-XII in FIG. 11.

FIG. 10 to FIG. 12 show a third embodiment in which the three positioning member divided bodies 103 of the positioning member 3 are coupled in a fixed state via a connection member 104. As shown in FIG. 12, the connection member 104 is disposed at an intersection portion between the three positioning member divided bodies 103, and each positioning member divided body 103 is coupled by inserting the tip end portion of each positioning member divided body 103 into a groove portion 104a formed on the outer periphery of the connection member 104. With the configuration in which each positioning member divided body 103 is coupled via the connection member 104 as described above, the work for mounting the positioning member 3 can be more easily and more reliably performed. Therefore, accurate positioning can be performed.

The tip end portion of each positioning member divided body 103 is not merely inserted into the groove portion 104a of the connection member 104 as shown in FIG. 12, but each groove portion 104a of the connection member 104 may be formed as a screw hole, an external thread portion may be provided to each positioning member divided body 103, and the connection member 104 and each positioning member divided body 103 may be threadedly connected to each other (not shown). In this case, the connection between the connection member 104 and the positioning member divided body 103 is ensured, and therefore, each intermediate link member 17 can be firmly held.

Contrary to the example of FIG. 12, projection portions may be provided to the connection member 104, a groove portion may be provided to each positioning member divided body 103, and the connection member 104 and the positioning member divided body 103 may be coupled to each other by inserting the projection portion of the connection member 104 into the groove portion of the positioning member divided body 103 (not shown).

Fourth Embodiment

Figure 13:
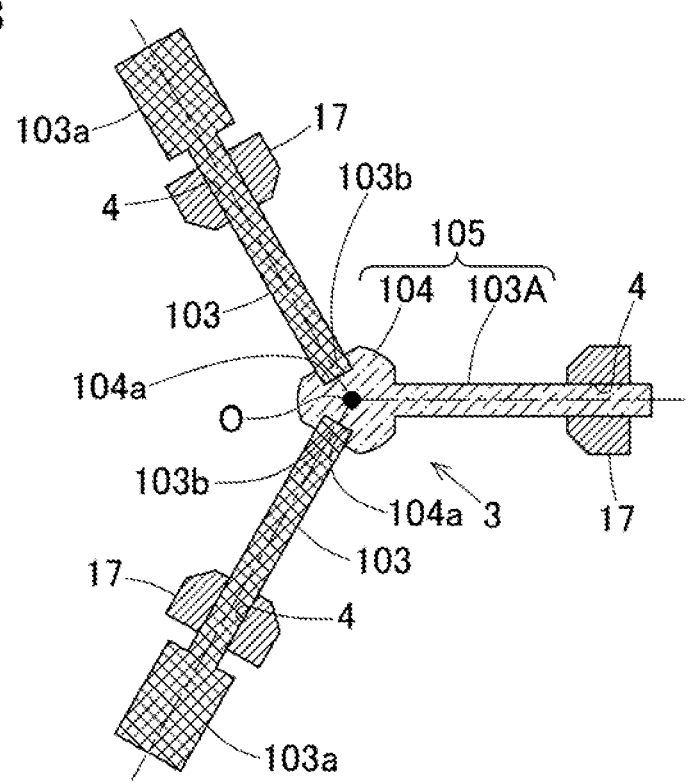
FIG. 13 is a cross-sectional view showing positioning portions and a positioning member of a link actuating device according to a fourth embodiment of the present invention.
Figure 14:
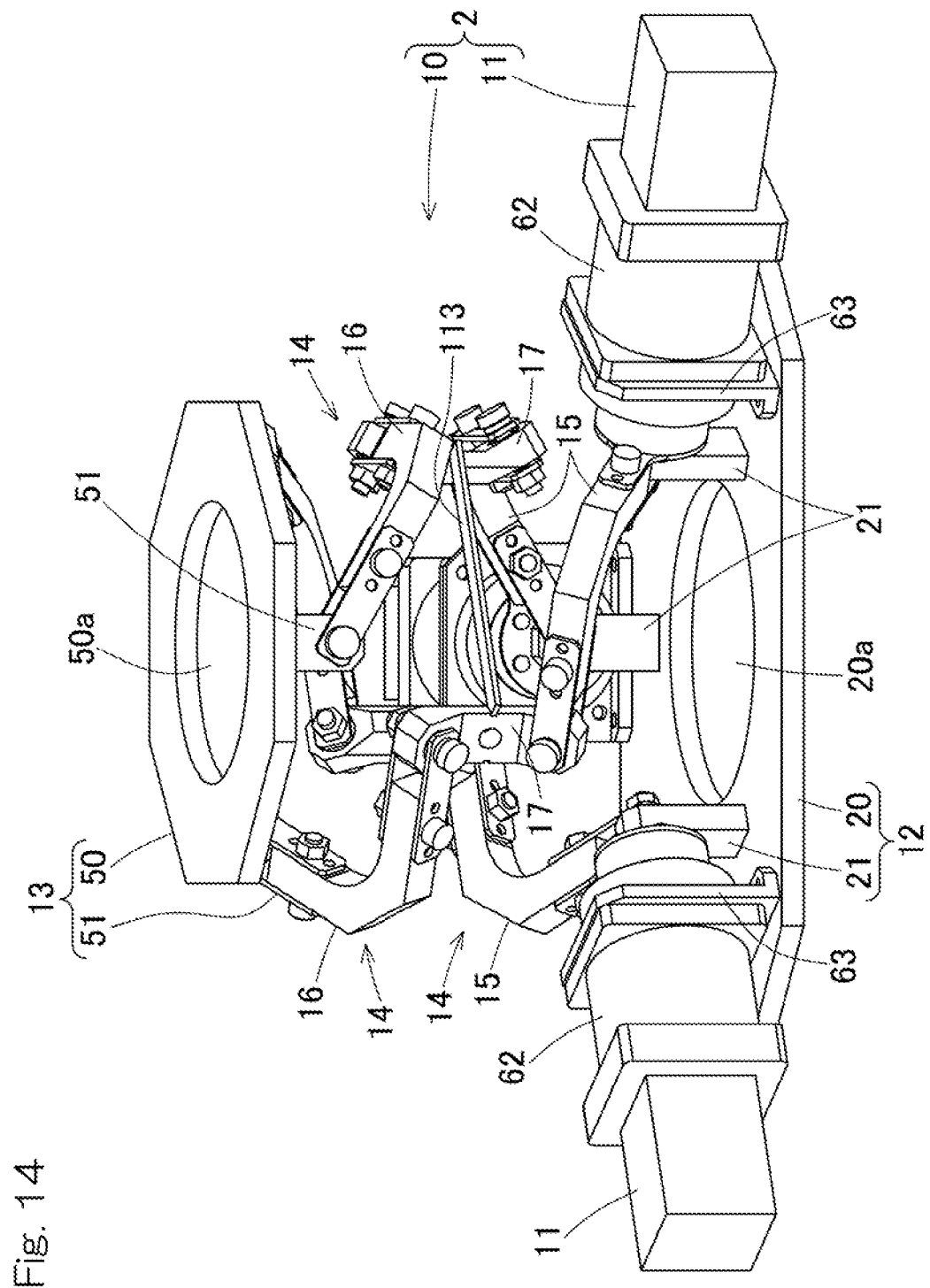
FIG. 14 is a perspective view showing a state when a link actuating device body of a link actuating device according to a fifth embodiment of the present invention is positioned in an origin posture by using a positioning member.

FIG. 13 shows a fourth embodiment in which one positioning member divided body 103A of the three positioning member divided bodies 103 of the positioning member 3 in the third embodiment is formed so as to be integrated with the connection member 104. The positioning member divided body 103A is not provided with a pinch portion 103a at a proximal end thereof. The positioning member divided body 103A and the connection member 104 cooperate together to form a connection member-integrated positioning member divided body 105.

With this configuration, the positioning member divided body 103A of the connection member-integrated positioning member divided body 105 is inserted into the positioning portion 4 of the intermediate link member 17 from the inner peripheral side. Thereafter, the other two positioning member divided bodies 103 are inserted into the positioning portions 4 of the other intermediate link members 17, and the distal end portions 103b of the two positioning member divided bodies 103 are inserted into the groove portions 104a of the connection member 104. By forming the one positioning member divided body 103A so as to be integrated with the connection member 104 in advance, the need to couple the positioning member divided body 103 to the connection member 104 while supporting the connection member 104 with one hand is eliminated. Therefore, the workability of the work for mounting the positioning member 3 is improved.

Fifth Embodiment

Figure 15:
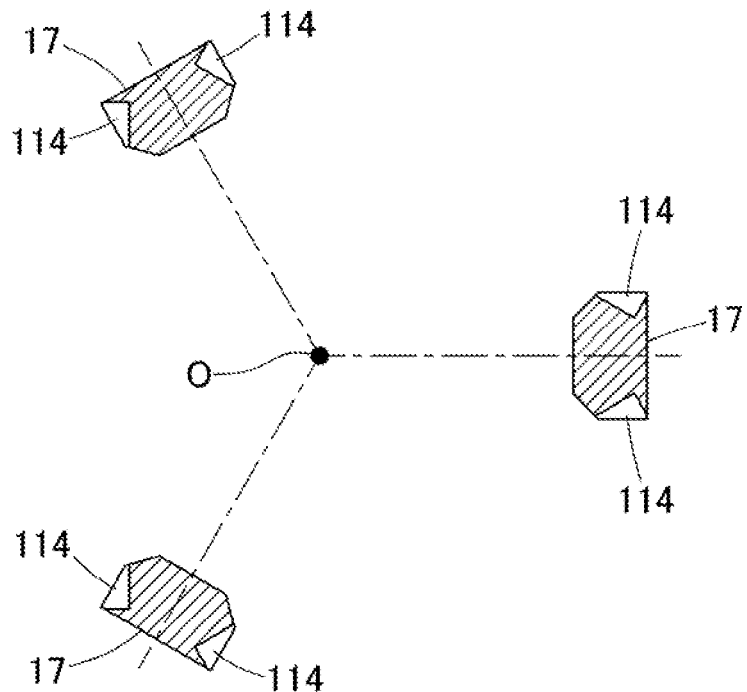
FIG. 15 is a cross-sectional view of intermediate link members of respective link mechanisms of the link actuating device body
Figure 16:
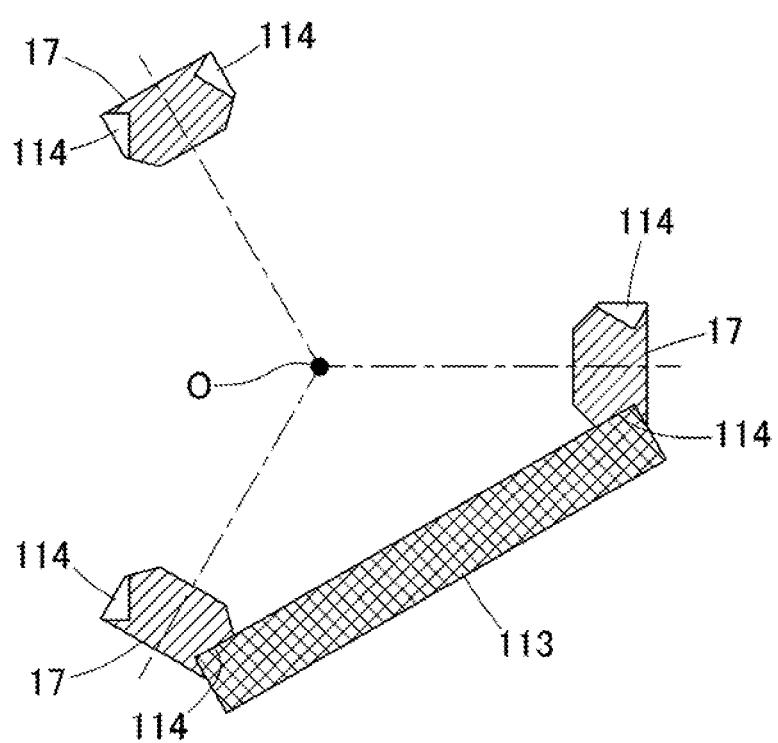
FIG. 16 is a cross-sectional view showing a state where the positioning member is mounted between positioning portions of one pair of adjacent two intermediate link members in the state of FIG. 15.
Figure 17:
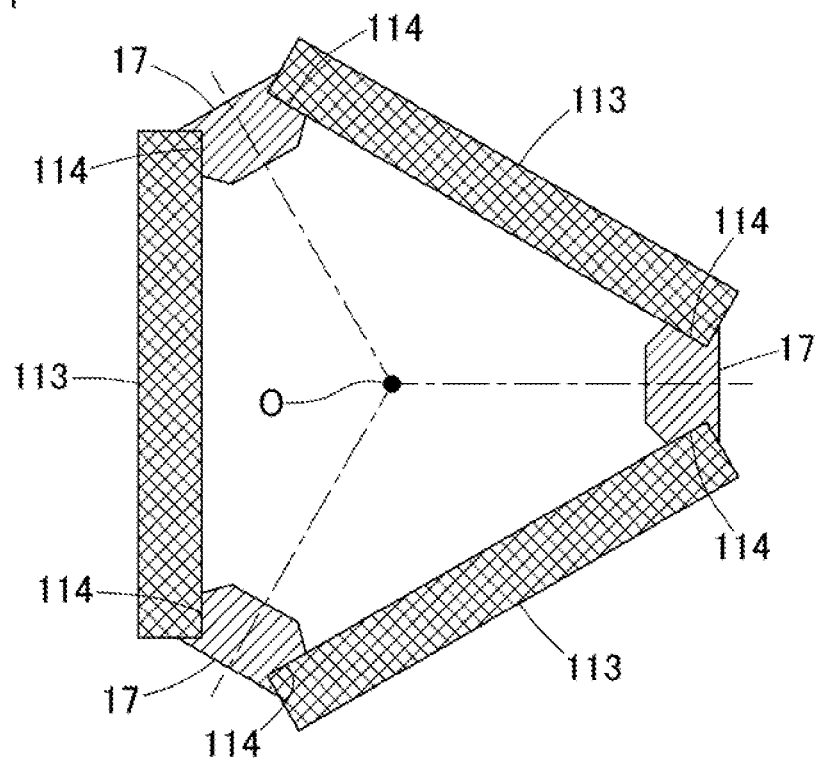
FIG. 17 is a cross-sectional view showing a state where the positioning member is mounted between positioning portions of each of three pairs of adjacent two intermediate link members in the state of FIG. 15.

FIG. 14 to FIG. 17 show a fifth embodiment in which a positioning member 113 is dismountably or detachably mounted between two positioning portions 114 provided to adjacent two intermediate link members 17, respectively. FIG. 15 is a cross-sectional view of the respective intermediate link members 17 in a state where no positioning member 113 is mounted, and FIG. 16 and FIG. 17 are each a cross-sectional view of the respective intermediate link members 17 in a state where the positioning member(s) 113 is(are) mounted. The positioning portions 114 of the fifth embodiment are groove-like cutouts that are provided on both side surfaces of each intermediate link member 17 and that have a triangular cross-sectional shape. In addition, each positioning member 113 is an elongated plate-like body that is engaged at both ends thereof with the positioning portions 114.

By mounting the positioning member 113 between the respective positioning portions 114 of adjacent two intermediate link members 17 as shown in FIG. 16, movement in the radial direction of the two intermediate link members 17 is restricted. Accordingly, the posture of the distal end side link hub 13 is uniquely determined. That is, when at least one positioning member 113 is mounted between the respective positioning portions 114 of adjacent two intermediate link members 17, the distal end side link hub 13 can be positioned in the origin posture.

As shown in FIG. 17, the positioning member 113 may be mounted between the respective positioning portions 114 of each of two or three pairs of adjacent two intermediate link members 17. In this case, the distal end side link hub 13 can be more firmly positioned in the origin posture.

When the positioning portions 114 are located on the outer peripheral portion of each link mechanism 14 as in the fifth embodiment, the workability of work for mounting the positioning member 113 is further improved. In addition, even when an end effector and a cable are disposed in the internal space of each link mechanism 14, the work for mounting the positioning member 113 can be performed without interfering with the end effector and the cable.

Sixth Embodiment

Figure 18:
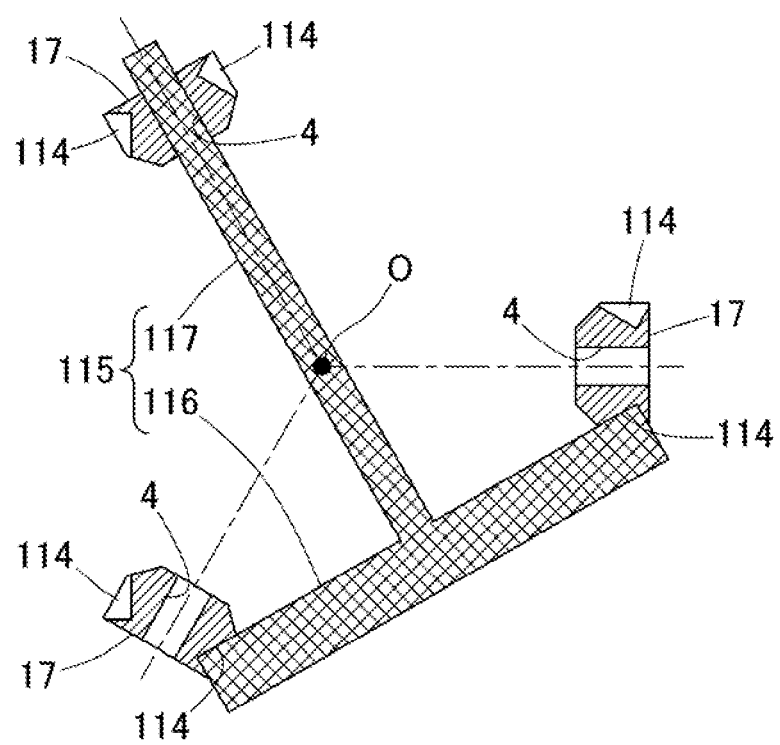
FIG. 18 is a cross-sectional view showing positioning portions and a positioning member of a link actuating device according to a sixth embodiment of the present invention.
Figure 19:
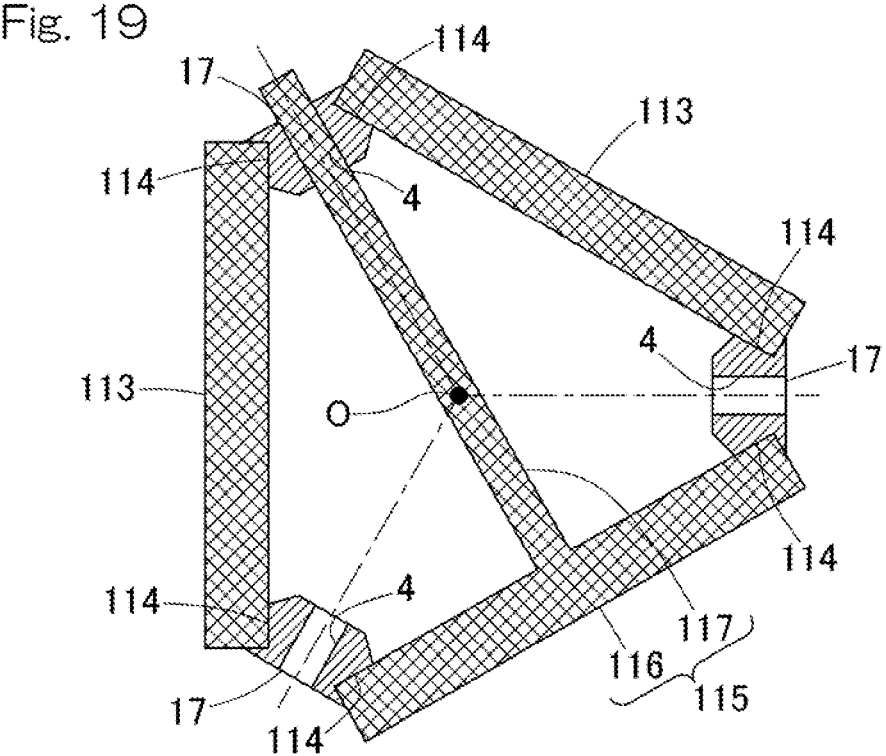
FIG. 19 is a cross-sectional view showing the positioning portions and the positioning member in a different state of the link actuating device.

FIG. 18 and FIG. 19 show a sixth embodiment in which the positioning portions 4 composed of through holes and the positioning portions 114 composed of cutouts are provided as positioning portions of the intermediate link members 17. The positioning portion 4 composed of a through hole forms "another positioning portion" provided to another intermediate link member 17 other than adjacent two intermediate link members 17. Such another positioning portion may be a recess instead of the through hole. These two kinds of the positioning portions 4 and 114 are provided to all of the three intermediate link members 17.

A positioning member 115 includes: a peripheral arrangement portion 116 that is composed of an elongated plate that can be engaged at both ends thereof with the positioning portions 114; and a projection portion 117 that extends radially inward from a center portion in the longitudinal direction of this peripheral arrangement portion and that can be inserted at a tip end portion thereof into the positioning portion 4.

With this configuration, as shown in FIG. 18, the distal end portion of the projection portion 117 is inserted into the positioning portion 4 of one intermediate link member 17 from the radially inner side, and opposite end portions of the peripheral arrangement portion 116 are brought into engagement with the positioning portions 114 of the other two intermediate link members 17. Accordingly, the one positioning member 115 restricts the postures of the three intermediate link members 17 relative to each other and positions the distal end side link hub 13 in the origin posture. In this case, since only the one positioning member 115 is used, the workability is good. In addition, since the postures of the three intermediate link members 17 are restricted at the same time, more accurate positioning is possible.

As shown in FIG. 19, in addition to restricting the three intermediate link members 17 by the positioning member 115, the two pairs of adjacent two intermediate link members 17 other than the one pair of adjacent two intermediate link members 17 on which the peripheral arrangement portion 116 of the positioning member 115 is mounted may be restricted by two positioning members 113. Accordingly, the distal end side link hub 13 can be more firmly positioned in the origin posture.

In each embodiment described above, the positioning portions 4, 114 are provided to the respective intermediate link members 17 of the link actuating device body 2 in which the parallel link mechanism 10 is of a rotation symmetry type, but positioning portions can be provided to intermediate link members of a link actuating device body in which a parallel link mechanism is of a mirror symmetry type (not shown). The direction in which each intermediate link member 17 is mounted is the same between the rotation symmetry type and the mirror symmetry type, and thus, components can be shared by the rotation symmetry type and the mirror symmetry type when the positioning portions 4, 114 are provided to the intermediate link members 17.

Seventh Embodiment

Figure 20:
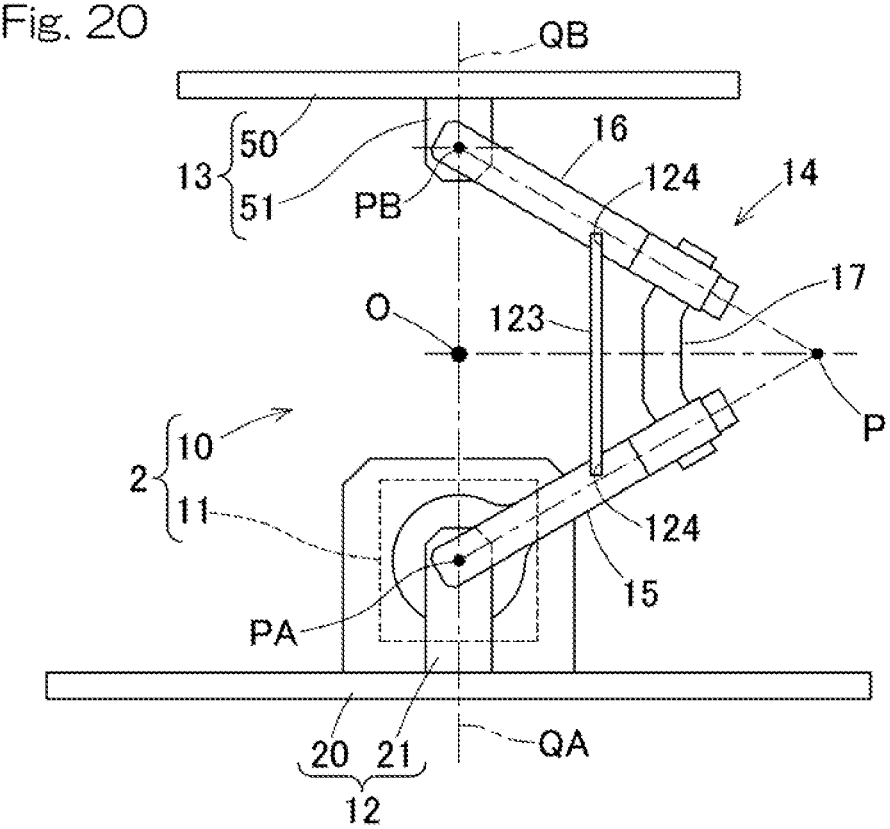
FIG. 20 is a front view showing a state when a link actuating device body of a link actuating device according to a seventh embodiment of the present invention is positioned in an origin posture by using a positioning member, wherein a part of the link actuating device is omitted.

FIG. 20 shows a seventh embodiment in which positioning portions 124 are provided to the proximal side end link member 15 and the distal side end link member 16, respectively, and a positioning member 123 is mounted between these positioning portions 124. Each positioning portion 124 is a groove-like cutout, and the positioning member 123 is an elongated plate-like body that is engaged at both ends thereof with the positioning portions 124. By mounting the positioning member 123 between the proximal side end link member 15 and the distal side end link member 16 in each of a plurality of the link mechanisms 14, the distal end side link hub 13 can be positioned in the origin posture.

In the case where the positioning member 123 is mounted between the proximal side end link member 15 and the distal side end link member 16 as in FIG. 20, the parallel link mechanism 10 of the link actuating device body 2 is preferably of a mirror symmetry type. In the parallel link mechanism 10 that is of a mirror symmetry type, the proximal side end link member 15 and the distal side end link member 16 are disposed in the same direction in the circumferential direction when viewed from the intermediate link member 17, and thus, it is easy to mount the positioning member 123.

Other Embodiments

In the first to sixth embodiments, the posture of the intermediate link member 17 of each link mechanism 14 is restricted relative to each other. But, if it is structurally possible to mount a positioning member, the posture of the proximal side end link member 15 or the distal side end link member 16 of each link mechanism 14 may be restricted relative to each other.

In addition, in the seventh embodiment, the positioning member 123 is mounted between the proximal side end link member 15 and the distal side end link member 16. But, if it is structurally possible to mount a positioning member, the positioning member may be mounted between the proximal side end link member 15 and the intermediate link member 17 or between the distal side end link member 16 and the intermediate link member 17.

Although the present invention has been described above in connection with the preferred embodiments thereof with reference to the accompanying drawings, the present invention is not limited to the above-described embodiments, and numerous additions, changes, or deletions can be made without departing from the gist of the present invention. Accordingly, such additions, changes, or deletions are to be construed as included in the scope of the present invention.

REFERENCE NUMERALS

1 . . . link actuating device
2 . . . link actuating device body
3, 113, 115, 123 . . . positioning member
4, 114, 124 . . . positioning portion
8 . . . storage unit
11 . . . posture control drive source
12 . . . proximal end side link hub
13 . . . distal end side link hub
14 . . . link mechanism
15 . . . proximal side end link member
16 . . . distal side end link member
17 . . . intermediate link member
103, 103-1, 103-2, 103-3, 103A . . . positioning member divided body
104 . . . connection member
105 . . . connection member-integrated positioning member divided body
117 . . . projection portion
O . . . point of intersection
O2A . . . central axis of revolute pair between proximal side end link member and intermediate link member
O2B . . . central axis of revolute pair between distal side end link member and intermediate link member
P . . . cross point

What is claimed is:

1. A link actuating device comprising:
a proximal end side link hub;
a distal end side link hub; and
three or more link mechanisms via which the distal end side link hub is coupled to the proximal end side link hub such that a posture of the distal end side link hub can be changed relative to the proximal end side link hub,
each of the link mechanisms including: a proximal side end link member rotatably coupled at one end thereof to the proximal end side link hub; a distal side end link member rotatably coupled at one end thereof to the distal end side link hub; and an intermediate link member rotatably coupled at both ends thereof to other ends of the proximal side and distal side end link members;
a posture control drive source is provided to each of two or more link mechanisms of the three or more link mechanisms and configured to arbitrarily change the posture of the distal end side link hub relative to the proximal end side link hub;
a storage unit configured to store therein an operating position of the posture control drive source when the distal end side link hub is in a defined posture relative to the proximal end side link hub;
a positioning member configured to position the distal end side link hub in the defined posture by restricting postures of a plurality of the link members relative to each other, the positioning member being provided to at least one link member of the proximal side end link member, the distal side end link member, and the intermediate link member in each of the two or more link mechanisms of the three or more link mechanisms; and
a positioning portion on which the positioning member is detachably mounted.

2. The link actuating device as claimed in claim 1, wherein the positioning portion is provided to the intermediate link member.

3. The link actuating device as claimed in claim 2, wherein the positioning portion is a through hole into which the positioning member is able to be inserted, and a central axis of the through hole passes through a plane including a point at which a central axis of a revolute pair between the proximal side end link member and the intermediate link member of each link mechanism and a central axis of a revolute pair between the distal side end link member and the intermediate link member of each link mechanism intersect each other, and intersects a point of intersection between a central axis of the proximal end side link hub and a central axis of the distal end side link hub.

4. The link actuating device as claimed in claim 3, wherein the positioning member includes two or more positioning member divided bodies each of which can be inserted into the one positioning portion, and the two or more positioning member divided bodies are coupled to each other in a fixed state via a connection member.

5. The link actuating device as claimed in claim 4, wherein one positioning member divided body of the two or more positioning member divided bodies is formed so as to be integrated with the connection member.

6. The link actuating device as claimed in claim 2, wherein the positioning member is detachably mounted between the two positioning portions provided to the adjacent two intermediate link members, respectively.

7. The link actuating device as claimed in claim 6, wherein
- another positioning portion composed of a through hole or a recess is provided to another intermediate link member other than the adjacent two intermediate link members, and
- the positioning member has a projection portion configured to restrict postures of the adjacent two intermediate link members and such another intermediate link member relative to each other by being inserted into such another positioning portion.

8. The link actuating device as claimed in claim 1, wherein
- the posture control drive source is a rotary actuator, and
- the storage unit stores therein a rotation angle of the posture control drive source when torque is applied in a state where the distal end side link hub is in an origin posture.

* * * * *

UNITED STATES PATENT AND TRADEMARK OFFICE
CERTIFICATE OF CORRECTION

PATENT NO. : 11,407,101 B2
APPLICATION NO. : 17/113668
DATED : August 9, 2022
INVENTOR(S) : Kenzou Nose et al.

It is certified that error appears in the above-identified patent and that said Letters Patent is hereby corrected as shown below:

On the Title Page

Item (56), Column 2, Line 2, delete "JP" and insert --EP--.

Signed and Sealed this
Fourth Day of October, 2022

Katherine Kelly Vidal
*Director of the United States Patent and Trademark Office*